US012588038B2

(12) United States Patent
Horiuchi et al.

(10) Patent No.: US 12,588,038 B2
(45) Date of Patent: Mar. 24, 2026

(54) COMMUNICATION DEVICE AND COMMUNICATION METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP); Yang Kang, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 302 days.

(21) Appl. No.: 18/552,619

(22) PCT Filed: Dec. 16, 2021

(86) PCT No.: PCT/JP2021/046590
§ 371 (c)(1),
(2) Date: Sep. 26, 2023

(87) PCT Pub. No.: WO2022/209044
PCT Pub. Date: Oct. 6, 2022

(65) Prior Publication Data
US 2024/0188101 A1 Jun. 6, 2024

(30) Foreign Application Priority Data

Mar. 29, 2021 (JP) ................................. 2021-055903

(51) Int. Cl.
*H04W 72/25* (2023.01)
*H04W 28/26* (2009.01)
(Continued)

(52) U.S. Cl.
CPC ........... *H04W 72/25* (2023.01); *H04W 28/26* (2013.01); *H04W 72/563* (2023.01); *H04W 92/18* (2013.01)

(58) Field of Classification Search
CPC ... H04W 72/25; H04W 28/26; H04W 72/563; H04W 92/18; H04W 4/40; H04W 72/569;
(Continued)

(56) References Cited

U.S. PATENT DOCUMENTS

| | | | |
|---|---|---|---|
| 12,238,759 B2 * | 2/2025 | Hwang | ............. H04W 72/1263 |
| 2022/0046663 A1 * | 2/2022 | Yang | ..................... H04W 28/26 |

(Continued)

FOREIGN PATENT DOCUMENTS

WO WO 2020114249 A1 6/2020

OTHER PUBLICATIONS

3GPP TR 38.885 V16.0.0, "3rd Generation Partnership Project; Technical Specification Group Radio Access Network; NR; Study on NR Vehicle-to-Everything (V2X) (Release 16)," Mar. 2019, 122 pages.

(Continued)

*Primary Examiner* — Abdullahi Ahmed
(74) *Attorney, Agent, or Firm* — Seed Intellectual Property Law Group LLP

(57) ABSTRACT

This communication device comprises a control circuit and a transmission circuit. The control circuit determines which of a plurality of communications to be prioritized, that include transmission and/or reception of information to adjust the use of resources between communication devices in side link communication. A communication circuit performs communication in accordance with the determination of the control circuit.

4 Claims, 19 Drawing Sheets

(51) Int. Cl.
  *H04W 72/563*      (2023.01)
  *H04W 92/18*      (2009.01)

(58) Field of Classification Search
  CPC .. H04W 72/40; H04W 74/0808; H04W 72/53
  See application file for complete search history.

(56) References Cited

U.S. PATENT DOCUMENTS

| | | | | |
|---|---|---|---|---|
| 2022/0303954 A1* | 9/2022 | Hwang | ............. | H04W 72/0453 |
| 2023/0239900 A1* | 7/2023 | Park | ...................... | H04W 36/06 |
| | | | | 370/329 |
| 2024/0188115 A1* | 6/2024 | Wu | ...................... | H04W 72/535 |

OTHER PUBLICATIONS

3GPP TS 23.501 V16.1.0, "3rd Generation Partnership Project; Technical Specification Group Services and System Aspects; System Architecture for the 5G System; Stage 2, (Release 16)," Jun. 2019, 368 pages.

3GPP TS 38.211 V15.6.0, "3rd Generation Partnership Project; Technical Specification Group Radio Access Network; NR; Physical channels and modulation, (Release 15)," Jun. 2019, 97 pages.

3GPP TS 38.300 V15.6.0, "3rd Generation Partnership Project; Technical Specification Group Radio Access Network; NR; NR and NG-RAN Overall Description; Stage 2 (Release 15)," Jun. 2019, 99 pages.

International Search Report dated Mar. 8, 2022, for the corresponding International Patent Application No. PCT/JP2021/046590, 4 pages.

International Telecommunication Union, "IMT Vision—Framework and overall objectives of the future development of IMT for 2020 and beyond," Recommendation ITU-R M.2083-0, Sep. 2015, 21 pages.

LG Electronics, "WID revision: NR sidelink enhancement," RP-201385, Agenda Item: 9.10.3, 3GPP TSG RAN Meeting #88e, Electronic Meeting, Jun. 29-Jul. 3, 2020, 6 pages.

NTT Docomo, Inc., "Resource allocation for reliability and latency enhancements," R1-2101631, Agenda Item: 8.11.1.2, 3GPP TSG RAN WG1 #104, e-Meeting, Jan. 25-Feb. 5, 2021, 11 pages.

Extended European Search Report dated Jul. 15, 2024, for the corresponding European Patent Application No. 21935193.9, 7 pages.

* cited by examiner

COMMUNICATION DEVICE AND COMMUNICATION METHOD

TECHNICAL FIELD

The present disclosure relates to a communication apparatus and a communication method.

BACKGROUND ART

The 3rd Generation Partnership Project (3GPP), which is an international standards-developing organization, has been studying development of the 5G communication system in terms of both the development of LTE/LTE-Advanced systems and a New Radio Access Technology (also referred to as New RAT or NR), which is a new method not necessarily backward compatible with the LTE/LTE-Advanced systems (see, e.g., Non Patent Literature (hereinafter referred to as "NPL") 1).

Further, in 3GPP, it has been studied to support V2X (vehicle to X) in LTE ahead. It has also been studied to support V2X in NR in which a wider band can be used. Further, not only V2X, but also further expansion of communication using a sidelink (SL: Sidelink) has been studied (e.g., see NPL 2).

CITATION LIST

Non-Patent Literature

NPL 1

3GPP TR 38.885V16.0.0, Study on NR Vehicle-to-Everything (V2X)(Release 16), 2019-03

NPL 2

RP-201385, "WID revision: NR sidelink enhancement", LG Electronics, 3GPP TSG RAN Meeting #88e, Electronic Meeting, Jun. 29-Jul. 3, 2020

SUMMARY OF INVENTION

There is scope for further study, however, on enhancing performance of sidelink communication.

A non-limiting embodiment of the present disclosure facilitates providing a communication apparatus and a communication method each capable of enhancing performance of sidelink communication.

A communication apparatus according to an embodiment of the present disclosure includes: control circuitry, which, in operation, determines to prioritize which of a plurality of communications including at least one of transmission and/ or reception of information for adjusting resource use between communication apparatuses in sidelink communication; and communication circuitry, which, in operation, performs communication in accordance with the determination of the control circuitry.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, it is possible to enhance performance of sidelink communication.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
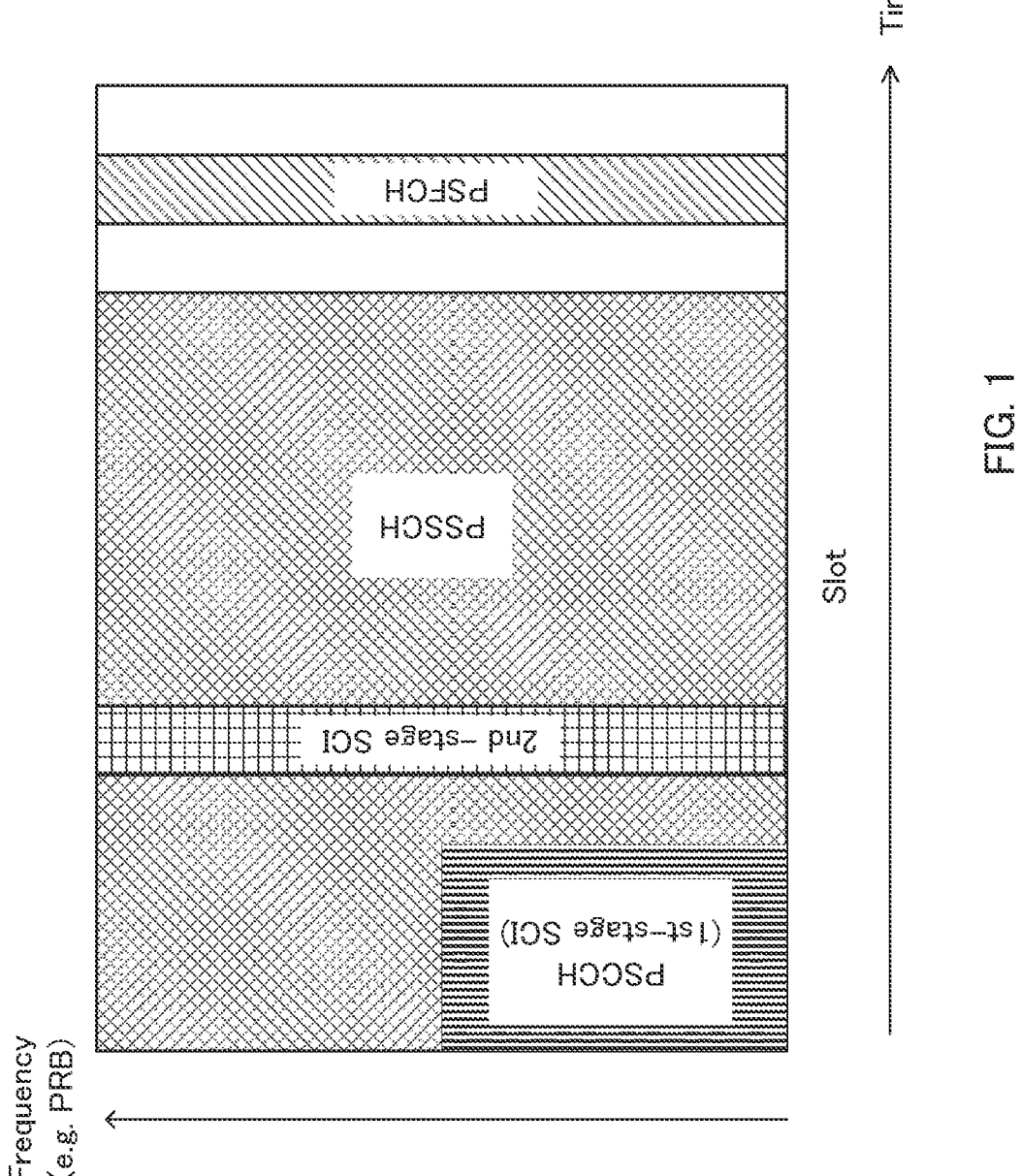
FIG. 1 illustrates exemplary channel mapping in a sidelink slot.

Hereinafter, embodiments of the present disclosure will be described in detail with reference to the drawings.

[Description of V2X]

In V2X, inter-vehicle (V2V: Vehicle to Vehicle), road-to-vehicle (V2I: Vehicle to Infrastructure), pedestrian-to-vehicle (V2P: Vehicle to Pedestrian), and inter-vehicle network (V2N: Vehicle to Network) communications are assumed, and in V2V, V2I, and V2P, terminals can communicate (e.g., at least one of transmission and reception) directly with one another using a link called a sidelink (SL: Sidelink) or PC5 without passing through a network with a base station. In V2N, it is assumed that communication is performed through a link called Uu between a base station (e.g., gNB in NR and eNB in LTE) and a terminal.

For example, a resource used for a sidelink is configured based on a SL Band width part (BWP) and a resource pool. The SL BWP specifies a frequency band usable for the sidelink, and may be configured separately from a DL BWP or UL BWP configured for base station-to-terminal (Uu). The frequency band possibly overlaps with a UL BWP.

The resource pool includes, for example, a resource in a frequency direction and a time direction specified for a resource in the SL BWP. A plurality of resource pools may be configured for one terminal. Frequency resources in a resource pool may be divided into units called subchannels, for example, and resource allocation may be configured in subchannel units. The subchannel may include a plurality of Physical resource blocks (PRBs).

[Description of Sidelink in NR]

For V2X of NR, it has been discussed to support unicast, groupcast, and broadcast in sidelink communication (e.g., at least one of transmission and reception).

In unicast, for example, one-to-one transmission from a transmission terminal (e.g., also referred to as transmitter UE or TX UE) to a reception terminal (e.g., receiver UE or RX UE) is assumed. In groupcast, for example, transmission from a transmission terminal to a plurality of reception terminals included in a certain group is assumed. In broadcast, for example, transmission from a transmission terminal not specifying a reception terminal is assumed. Note that UE is an abbreviation for User Equipment and is an example of a "terminal."

[Description of SL Channel]

For an SL of NR, configuration of channels such as a physical SL control channel (PSCCH), a physical SL shared channel (PSSCH), a physical SL feedback channel (PSFCH), and a physical SL broadcast channel (PSBCH) are considered.

The PSCCH is an exemplary control channel in an SL, and the PSSCH is an exemplary data channel in an SL. The PSFCH is an exemplary channel used for transmission of a feedback signal in an SL, and the PSBCH is an exemplary broadcast channel used for transmission that does not specify a reception terminal. Note that, in the following description, the terms "signal" and "information" may be replaced with each other depending on the context.

In a PSCCH, for example, a control signal (or control information) called sidelink control information (SCI) is mapped. The SCI includes, for example, information (or a parameter) on at least one of transmission and reception of a data signal (e.g., PSSCH), such as information on resource allocation of a PSSCH.

The information content of SCI, which will be described later, may be divided (or classified) into, for example, first information (or control information) and second information (or control information). In other words, the SCI may include, for example, "first control information" and "second control information" regarding the SL. The "second control information" may be regarded as exemplary information related to the "first control information". The "first control information" and the "second control information" may be referred to as, for example, "1st stage SCI" and "2nd stage SCI", respectively.

The 1st stage SCI may be mapped to a PSCCH, which is an exemplary SL control channel, and the 2nd stage SCI may be mapped to a PSSCH, which is an exemplary SL data channel. In other words, the SCI may be separated and mapped to a PSCCH and a PSSCH. Note that the term "mapping" may be interchanged with another appropriate term such as "allocation," or "(mapping) pattern" (the same applies hereinafter) by a person skilled in the art.

In a PSSCH, a data signal or a data signal and SCI (e.g., 2nd stage SCI) are mapped, for example.

In a PSFCH, for example, a feedback signal (e.g., a hybrid automatic repeat request (HARQ) feedback) for a PSSCH (e.g., a data signal) is mapped. The feedback signal may include, for example, a response signal (e.g., ACK/NACK information, also referred to as HARQ-ACK) indicating an ACK or NACK.

It is assumed that the feedback signal is used, for example, when a PSSCH is transmitted and received by unicast and groupcast. The ACK and NACK may be referred to as a HARQ-ACK and a HARQ-NACK, respectively, for example.

In a PSBCH, for example, a broadcast signal that does not specify a reception terminal is mapped. The PSBCH is, for example, transmitted together with a sidelink Primary synchronization signal (S-PSS) and a sidelink secondly synchronization signal (S-SSS), which are signals for synchronization, and may be collectively referred to as a sidelink synchronization signal block (S-SSB).

[Description of SCI]

A non-limiting example of information included in each of 1st stage SCI and 2nd stage SCI is as follows.

<1st Stage SCI>

Priority—3 bits

Frequency resource assignment

Time resource assignment—5 bits or 9 bits

Resource reservation period—[log 2(N_(reservePeriod)] bits or 0 bits

DMRS pattern[x] bits or 0 bits

2nd stage SCI format 2 bits

Beta_offset indicator 2 bits

Number of DMRS port 1 bit

Modulation and coding scheme—5 bits

Additional MCS table indicator—2 bits or 0 bits

PSFCH overhead indication—1 bit

Reserved—[sl-NumReservedBits] bits or 0 bits

<2nd Stage SCI>

In 2nd stage SCI, for example, two types of formats of SCI format 2-A and SCI format 2-B may be prepared as follows.

<SCI Format 2-A>

HARQ process number—[log_2(N_process)] bits

New data indicator—1 bit

Redundancy version—2 bits

Source ID—8 bits

Destination ID—16 bits

HARQ feedback enabled/disabled indicator—1 bit

Cast type indicator—2 bits

CSI request—1 bit

<SCI Format 2-B>

HARQ process number—[log_2(N_process)] bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits

In V2X SL communication, for example a terminal confirms a use status (or reservation status) of a resource by another terminal by sensing, and then determines a resource to be used for transmission. Dividing an information content of SCI into two pieces can reduce the number of bits and the size of 1st stage SCI, thus having an advantage that an area used for sensing can be reduced. For example, 1st stage SCI may be mapped to a PSCCH, and 2nd stage SCI may be mapped to a PSSCH (may be a part of a PSSCH). Note that the term "DMRS" is an abbreviation for a demodulation reference signal, and "CSI" is an abbreviation for channel state information.

FIG. 1 illustrates exemplary mapping of a PSCCH, a PSSCH, and a PSFCH in a slot. For example, the PSFCH is not mapped in some cases depending on the configuration. Further, the number of symbols of the PSSCH is variable depending on the configuration. Furthermore, the mapping of 2nd stage SCI may be changed depending on the mapping of a DMRS (not illustrated) in the PSSCH, for example. For example, 1st stage SCI may be mapped from a lower frequency resource than a frequency resource to which the PSSCH is assigned. One slot is configured of, for example, 14 symbols (12 symbols when an extended CP (Cyclic Prefix) is applied).

[Description of SL Model]

SL communication includes, for example, two modes (e.g., Mode 1 and Mode 2).

In Mode 1, for example, the base station determines (in other words, schedules) a resource to be used by the terminal in an SL (e.g., referred to as an SL resource).

In Mode 2, for example, the terminal selects (or determines) a resource to be used for the SL from resources in a preconfigured resource pool. In other words, in Mode 2, the base station need not schedule an SL resource.

For example, Mode 1 is assumed to be used in an environment in which the terminal and the base station are connected with each other and the terminal performing sidelink communication can receive indication (or notification) from the base station. On the other hand, in Mode 2, for example, the terminal can determine a resource to be used for the SL even when no indication is transmitted from the base station. This allows sidelink communication including terminals under the control of different operators or terminals outside the coverage, for example.

The sidelink has been described above.

[Overview of Communication System]

Figure 2:
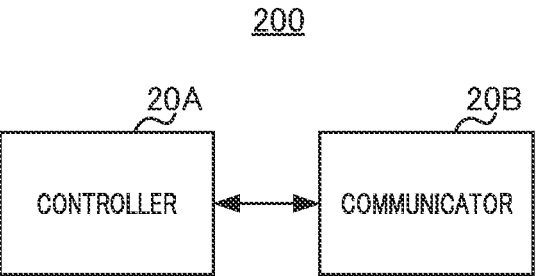
FIG. 2 is a block diagram illustrating an exemplary configuration of a part of a terminal.
Figure 3:
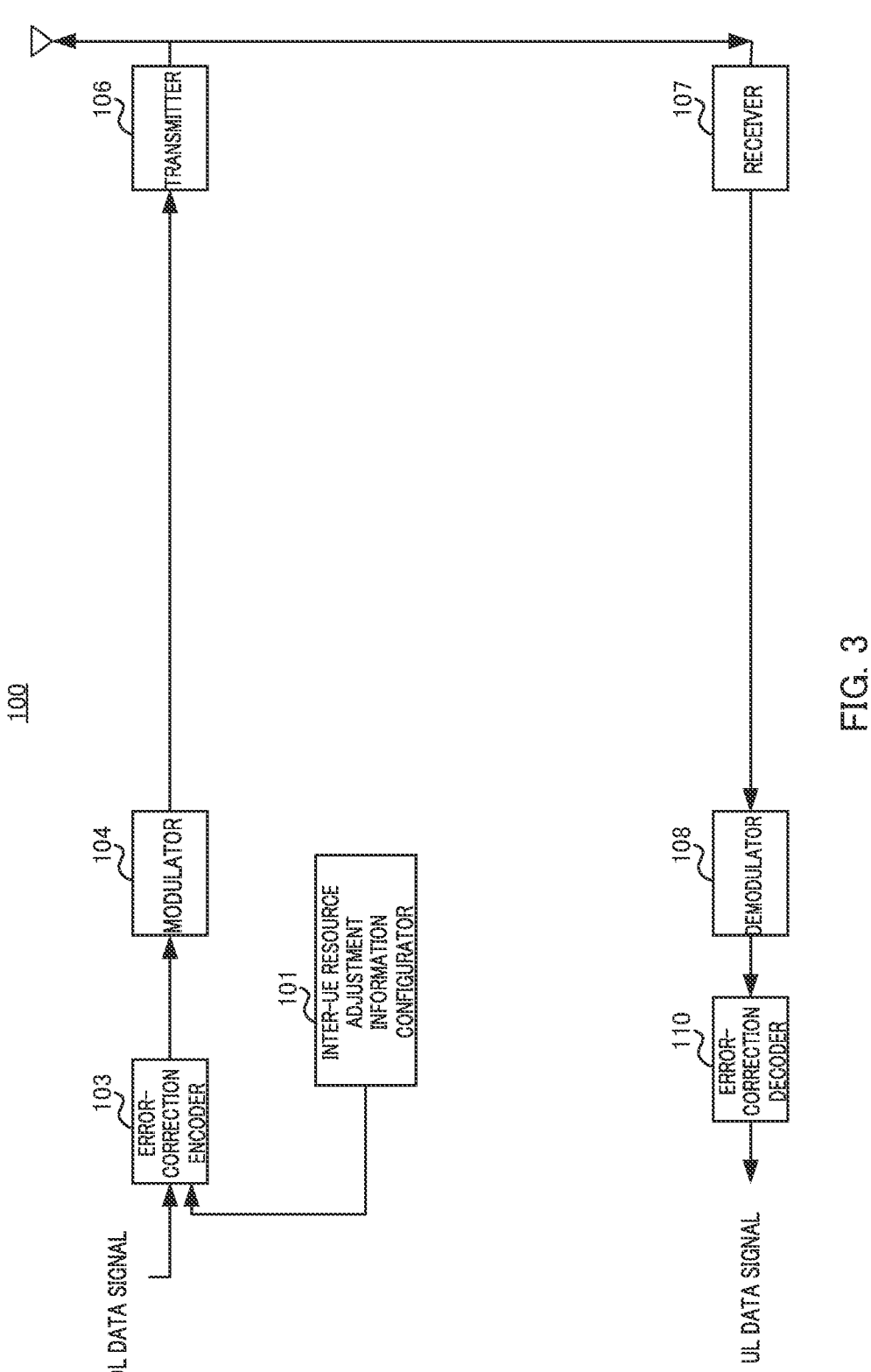
FIG. 3 is a block diagram illustrating an exemplary configuration of a base station.

A communication system according to the present embodiment includes, for example, terminal 200 illustrated in FIG. 2 and base station 100 illustrated in FIG. 3. The number of terminals 200 may be one or more, but is two or more when focusing on sidelink communication. Note that base station 100 and terminal 200 are each an example of a communication apparatus.

FIG. 2 is a block diagram illustrating an exemplary configuration of a part of terminal 200 according to the embodiment. Terminal 200 illustrated in FIG. 2 may include, for example, controller (or control circuitry) 20A and communicator (or communication circuitry) 20B.

Controller 20A determines and generates, from the perspective of transmission terminal 200 of a sidelink, information for adjusting (or performing coordination control of) use (or utilization) of resources in sidelink communication between terminals 200. This information is exemplary information on coordinated use of sidelink resources between terminals, and may be understood as one type of control information transmitted and received between terminals 200. Further, this information may be referred to as "inter-UE resource adjustment information," "resource coordination control information," or "inter-UE coordinate information" for convenience, for example.

Controller 20A determines which of a plurality of communications including, for example, at least one of transmission and reception of inter-UE resource adjustment information is prioritized from the perspective of a transmission terminal of a sidelink.

Communicator 20B performs communication, for example, in accordance with the determination of controller 20A from the perspective of a transmission terminal of the sidelink.

Further, communicator 20B receives, from the perspective of reception terminal 200 of a sidelink, inter-UE resource adjustment information transmitted by another terminal 200. Thus, communicator 20B may be understood to correspond to exemplary reception circuitry that receives inter-UE resource adjustment information from the perspective of reception terminal 200.

Further, from the perspective of a reception terminal of a sidelink, controller 20A determines a resource used for sidelink communication (e.g., transmission), based on the inter-UE resource adjustment information received by communicator 20B. For example, controller 20A stops or starts transmission of the PSSCH based on the received inter-UE resource adjustment information.

[Configuration of Base Station 100]

FIG. 3 is a block diagram illustrating an exemplary configuration of base station 100 according to the embodiment. As illustrated in FIG. 3, base station 100 includes, for example, inter-UE resource adjustment information configurator 101, error-correction encoder 103, modulator 104, transmitter 106, receiver 107, demodulator 108, and error-correction decoder 110.

Inter-UE resource adjustment information configurator 101 determines whether to cause terminal 200 to transmit inter-UE resource adjustment information based on a use case (illustration is omitted) or information reported from terminal 200, for example, information such as a characteristic or a capability of terminal 200.

When determining to cause terminal 200 to transmit inter-UE resource adjustment information, inter-UE resource adjustment information configurator 101 outputs, to error-correction encoder 103, information on a transmission configuration of inter-UE resource adjustment information as, for example, higher layer (e.g., RRC) signaling.

Note that, in this embodiment, information to be transmitted in a higher layer (e.g., RRC) is generated in inter-UE resource adjustment information configurator 101, and transmission of the inter-UE resource adjustment information is configured in terminal 200. However, this configuration may be a configuration in an application layer called pre-configured, or may be preconfigured in SIM (Subscriber Identity Module), and thus terminal 200 can operate without a configuration from base station 100, for example.

Error-correction encoder 103 inputs, for example, a transmission data signal (DL data signal) and higher layer signaling, performs error correction encoding on the inputted signal, and outputs the encoded signal to modulator 104.

For example, modulator 104 performs modulation processing on the signal inputted from error-correction encoder 103 and outputs the modulated data signal to transmitter 106.

For example, transmitter 106 performs radio transmission processing such as up-conversion and amplification on the signal inputted from signal assigner 105, and transmits the radio signal from an antenna to terminal 200.

For example, receiver 107 receives a signal transmitted from terminal 200 via an antenna, performs radio reception processing such as low-noise amplification and down-conversion, and outputs the received signal to demodulator 108.

Demodulator 108, for example, performs demodulation processing on the input signal, and outputs the obtained signal to error-correction decoder 110.

For example, error-correction decoder 110 decodes the signal inputted from demodulator 108 to obtain a received data signal (UL data signal) from terminal 200.

Note that, in Mode 1, information on SCI transmitted by terminal 200 in the sidelink may be generated by base station 100 (e.g., inter-UE resource adjustment information configurator 101 or not-illustrated another block). The SCI generated by base station 100 may be transmitted to terminal 200, for example, as a higher layer signal or a physical layer (e.g., Physical Downlink Control Channel (PDCCH)) signal.

[Configuration of Terminal 200]

Figure 4:
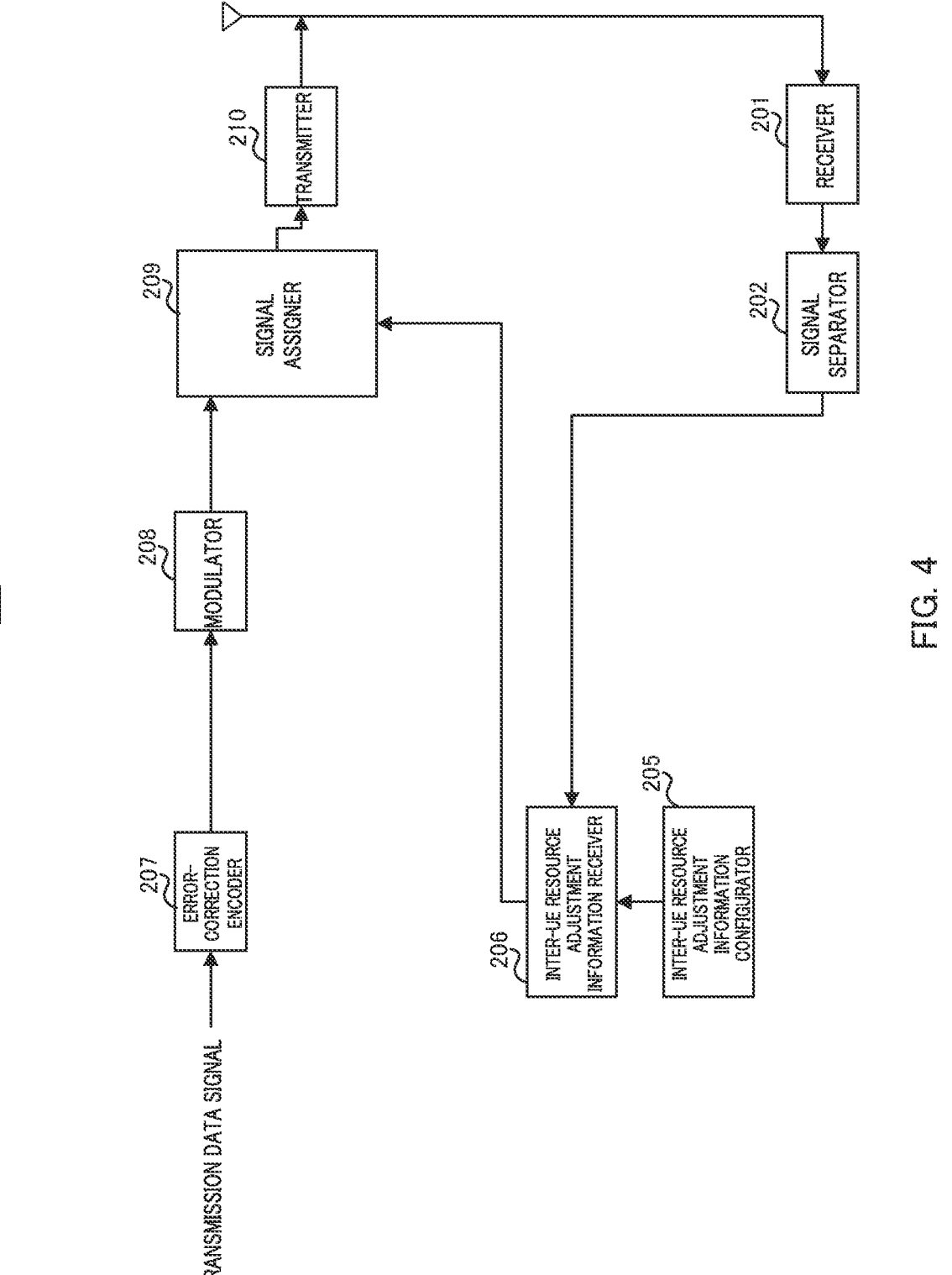
FIG. 4 is a block diagram illustrating the first configuration example of the terminal.
Figure 5:
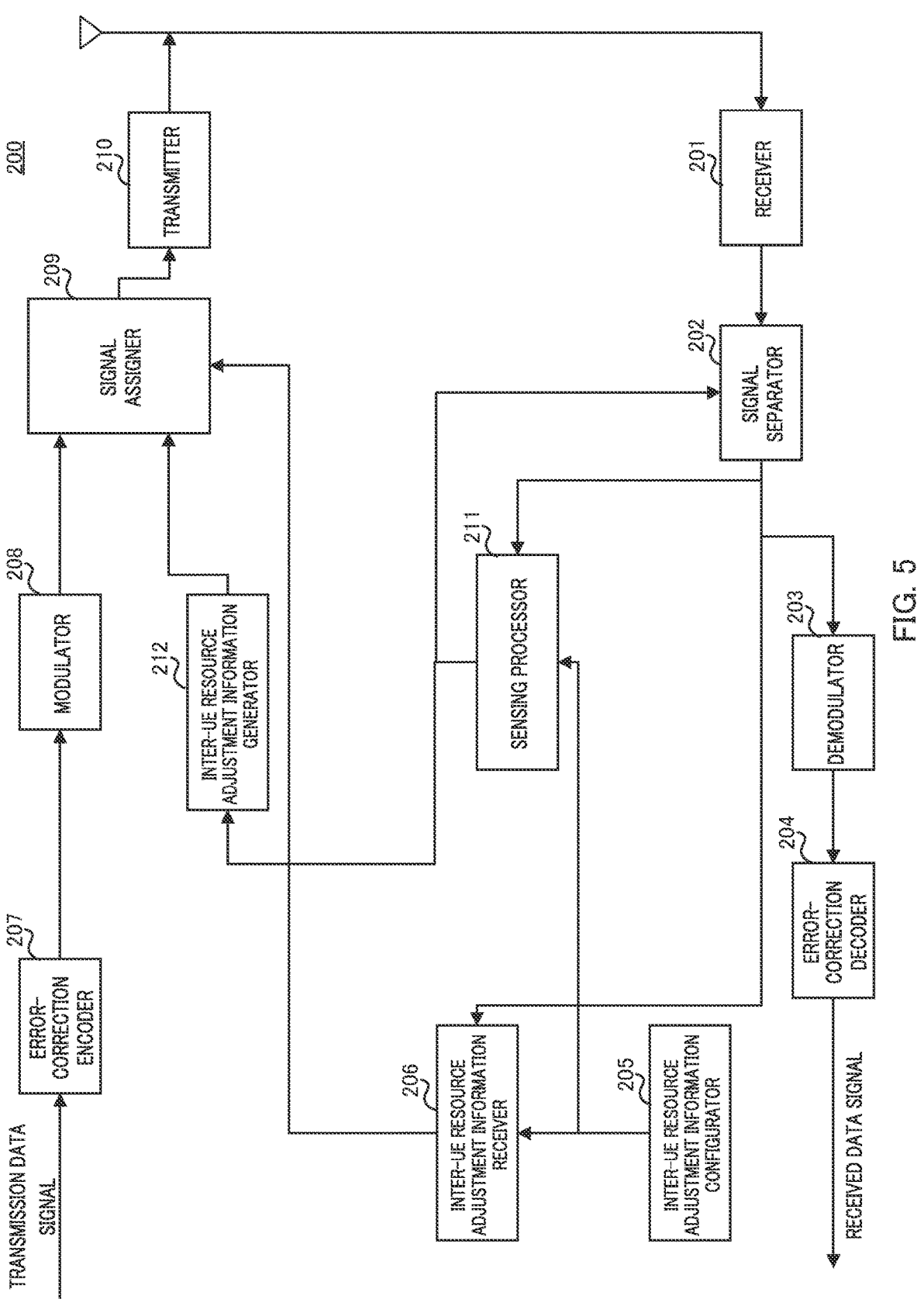
FIG. 5 is a block diagram illustrating the second configuration example of the terminal.
Figure 6:
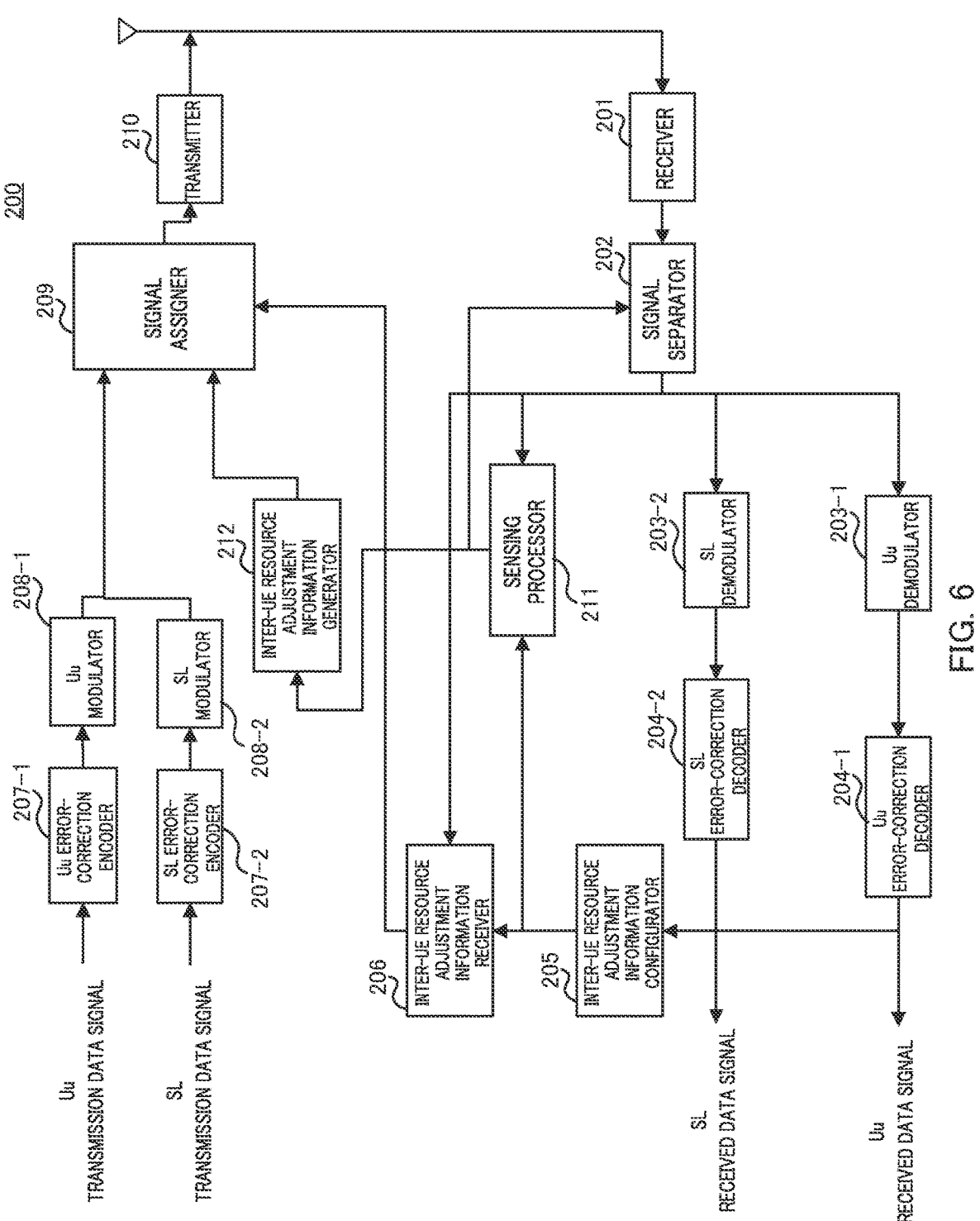
FIG. 6 is a block diagram illustrating the third configuration example of the terminal.

FIGS. 4, 5, and 6 are block diagrams illustrating the first, second, and third configurations of terminal 200, respectively, according to the embodiment of the present disclosure. In the sidelink communication, terminal 200 can be both a transmission terminal and a reception terminal.

(First Configuration of Terminal 200)

For example, terminal 200 of the first configuration illustrated in FIG. 4 is assumed to at least support reception of inter-UE resource adjustment information transmitted by another terminal 200 but not to support reception of signals of some channels (e.g., PSSCH and PSCCH).

Such terminal 200 need not perform sensing, and thus can reduce power consumption, for example. For example, it is advantageous that, when a vehicle and a smartphone (e.g., Pedestrian UE) communicate with each other, the smartphone can perform sidelink transmission without performing sensing. Note that the term "sensing" may be understood as receiving 1st stage SCI transmitted by another terminal 200 in a certain time section.

In FIG. 4, terminal 200 includes, for example, receiver 201, signal separator 202, inter-UE resource adjustment information configurator 205, inter-UE resource adjustment information receiver 206, error-correction encoder 207, modulator 208, signal assigner 209, and transmitter 210.

For example, receiver 201 receives a reception signal via an antenna, performs radio reception processing such as low-noise amplification and down-conversion on the reception signal, and then outputs the signal to signal separator 202.

For example, signal separator 202 separates inter-UE resource adjustment information from the output signal of receiver 201 and outputs the inter-UE resource adjustment information to inter-UE resource adjustment information receiver 206.

For example, inter-UE resource adjustment information configurator 205 configures inter-UE resource adjustment information receiver 206 to receive inter-UE resource adjustment information by a higher layer signal from base station 100 or another terminal 200 or by a preconfiguration called pre-configured.

For example, inter-UE resource adjustment information receiver 206 requests signal assigner 209 to reallocate a resource when receiving a signal indicating that the resource allocated by using a PSCCH is not preferred (or is not suitable).

For example, error-correction encoder 207 inputs a data signal to be transmitted, performs error correction encoding on the data signal, and outputs the data signal to modulator 208.

For example, modulator 208 modulates the signal inputted from error-correction encoder 207, and outputs the modulated signal to signal assigner 209.

For example, signal assigner 209 assigns the signal inputted from modulator 208 to a resource used for transmission. When resource reallocation is requested from inter-UE resource adjustment information receiver 206, signal assigner 209 changes the resource allocation in accordance with the request. The signal assigned to the resource is outputted to transmitter 210, for example.

For example, transmitter 210 performs radio transmission processing such as amplification and up-conversion on the signal inputted from signal assigner 209, and transmits the radio signal from an antenna.

(Second Configuration of Terminal 200)

Terminal 200 of the second configuration illustrated in FIG. 5 receives inter-UE resource adjustment information from another terminal 200 and supports reception of signals from channels that are not supported in the first configuration (e.g., PSSCH and PSCCH). Further, terminal 200 of the second configuration supports, for example, sensing processing and data reception.

As illustrated in FIG. 5, terminal 200 of the second configuration includes, for example, receiver 201, signal separator 202, demodulator 203, error-correction decoder 204, inter-UE resource adjustment information configurator 205, inter-UE resource adjustment information receiver 206, error-correction encoder 207, modulator 208, signal assigner 209, transmitter 210, sensing processor 211, and inter-UE resource adjustment information generator 212.

For example, receiver 201 receives a reception signal via an antenna, performs radio reception processing such as low-noise amplification and down-conversion on the reception signal, and then outputs the signal to signal separator 202.

For example, in the received signal, signal separator 202 outputs the reception data signal to demodulator 203, and outputs inter-UE resource adjustment information to inter-UE resource adjustment information receiver 206. Further, for example, signal separator 202 separates 1st stage SCI mapped to a PSCCH and 2nd stage SCI mapped to a part of a PSSCH from the received signal, and outputs the 1st stage SCI and 2nd stage SCI to sensing processor 211 as sensing information.

For example, demodulator 203 performs demodulation processing on the signal (e.g., data signal) inputted from signal separator 202, and outputs the demodulated signal to error-correction decoder 204.

For example, error-correction decoder 204 decodes the demodulated signal inputted from demodulator 203, and outputs the decoded signal as received data.

For example, when there is input from inter-UE resource adjustment information configurator 205, sensing processor 211 obtains resource allocation information such as which resource is reserved, based on 1st stage SCI. Further, sensing processor 211 obtains at least one of transmission source ID (source ID) and transmission destination ID (destination ID) based on 2nd stage SCI, and detects whether the resource is preferred for transmission.

"The resource is not-preferred for transmission" means that, for example, an event such as a resource collision or such that transmission timing and reception timing does not match between a transmission terminal and a reception terminal is detected. When such an event is not detected, it may be determined that "the resource is preferred for transmission." When it is detected that the resource is not-preferred for transmission, sensing processor 211 outputs the detection to inter-UE resource adjustment information generator 212, for example.

Note that the terms (the resource is) "preferred/not-preferred" (for transmission) may be interchanged with other terms such as "desirable/undesirable," "adapted/not-adapted," and "recommended/not-recommended," for example.

Further, for example, when sensing processor 211 detects, from the resource allocation information, that there is resource allocation addressed to terminal 200 illustrated in FIG. 5, sensing processor 211 indicates the resource information to signal separator 202. This indication allows signal separator 202 to separate a signal mapped to a resource indicated from sensing processor 211 from a reception signal.

For example, inter-UE resource adjustment information configurator 205 configures inter-UE resource adjustment information receiver 206 and sensing processor 211 to receive inter-UE resource adjustment information by a higher layer signal from base station 100 or another terminal 200 or by a preconfiguration called pre-configured.

For example, inter-UE resource adjustment information receiver 206 requests signal assigner 209 to reallocate a resource when receiving a signal indicating that the resource allocated by using a PSCCH is not preferred for transmission.

For example, inter-UE resource adjustment information generator 212 generates, when receiving an indication from sensing processor 211 that there is resource allocation that is not preferred for transmission, inter-UE resource adjustment information for indicating, to another terminal 200, the resource that is not preferred for transmission, and outputs the inter-UE resource adjustment information to signal assigner 209.

For example, signal assigner 209 assigns the signal inputted from modulator 208 to a resource used for transmission. Further, for example, when resource reallocation is requested from inter-UE resource adjustment information receiver 206, signal assigner 209 changes the resource allocation. When inter-UE resource adjustment information is inputted from inter-UE resource adjustment information generator 212, signal assigner 209 assigns the inter-UE resource adjustment information to a resource used for transmission to another terminal 200, for example. The signal assigned to the resource is outputted to transmitter 210, for example.

In signal assigner 209, ACK/NACK information may be assigned to an SL feedback channel (e.g., PSFCH), for example.

Note that error-correction encoder 207, modulator 208, and transmitter 210 may be the same as error-correction encoder 207, modulator 208, and transmitter 210 described above with reference to FIG. 4, respectively.

(Third Configuration of Terminal 200)

Terminal 200 of the third configuration illustrated in FIG. 6 supports, for example, communication with base station 100 in addition to sidelink communication with another terminal 200. A link between base station 100 and terminal 200 is also referred to as a "Uu link," for example. Communication using a Uu link may be referred to as Uu communication, for example.

It may be understood that the configuration illustrated in FIG. 6 corresponds to a configuration in which a demodulator, an error-correction decoder, an error-correction encoder, and a modulator are configured for each of a Uu link and an SL as individual blocks in the second configuration illustrated in FIG. 5. It may be understood that, in FIG. 6, blocks denoted by the same reference numerals as those used in FIG. 5 correspond to the blocks described in FIG. 5.

In FIG. 6, terminal 200 includes, for example, receiver 201, signal separator 202, Uu demodulator 203-1, SL demodulator 203-2, Uu error-correction decoder 204-1, and SL error-correction decoder 204-2. Terminal 200 further includes, for example, inter-UE resource adjustment information configurator 205, inter-UE resource adjustment information receiver 206, sensing processor 211, and inter-UE resource adjustment information generator 212. Furthermore, terminal 200 includes Uu error-correction encoder

207-1, SL error-correction encoder 207-2, Uu modulator 208-1, SL modulator 208-2, signal assigner 209, and transmitter 210, for example.

For example, receiver 201 receives a reception signal via an antenna, performs radio reception processing such as low-noise amplification and down-conversion on the reception signa, and then outputs the signal to signal separator 202.

For example, signal separator 202 separates inter-UE resource adjustment information, a Uu link signal, and an SL signal from the signal received by receiver 201, and outputs the inter-UE resource adjustment information to inter-UE resource adjustment information receiver 206, and the Uu link signal to Uu demodulator 203-1.

Further, for example, signal separator 202 separates the data part addressed to terminal 200 in a PSSCH from the SL signal, and outputs the separated data part to SL demodulator 203-2. Further, for example, signal separator 202 separates 1st stage SCI mapped to a PSCCH and 2nd stage SCI mapped to a part of a PSSCH from the received signal, and outputs the 1st stage SCI and 2nd stage SCI to sensing processor 211 as sensing information.

For example, Uu demodulator 203-1 performs demodulation processing on the signal inputted from signal separator 202, and outputs the demodulated signal to Uu error-correction decoder 204-1.

Uu error-correction decoder 204-1 decodes the demodulated signal inputted from Uu demodulator 203-1, and outputs the decoded signal. In the decoded signal, higher layer signaling in the decoded signal is output to inter-UE resource adjustment information receiver 206, for example.

For example, SL demodulator 203-2 performs demodulation processing on the signal inputted from signal separator 202, and outputs the demodulated signal to SL error-correction decoder 204-2.

For example, SL error-correction decoder 204-2 decodes the demodulated signal inputted from SL demodulator 203-2, and performs error determination such as CRC on the decoded signal. As a result of the error determination, a signal determined that there is no error is outputted as an SL received data signal.

Inter-UE resource adjustment information configurator 205 configures inter-UE resource adjustment information receiver 206 and sensing processor 211 to receive inter-UE resource adjustment information by a control signal of a higher layer inputted from Uu error-correction decoder 204-1, a higher layer signal transmitted from another terminal 200, a configuration of SIM, or a configuration of an application layer called pre-configured. Note that terminal 200 may use preconfigured information without receiving configuration information for receiving inter-UE resource adjustment information.

For example, inter-UE resource adjustment information receiver 206 requests signal assigner 209 to reallocate a resource when receiving a signal indicating that the resource allocated by using a PSCCH is not preferred for transmission.

For example, Uu error-correction encoder 207-1 inputs a Uu link transmission data signal (UL data signal), performs error correction encoding on the transmission signal, and outputs the encoded signal to Uu modulator 208-1.

For example, Uu modulator 208-1 modulates the signal inputted from Uu error-correction encoder 207-1, and outputs the modulated signal to signal assigner 209.

For example, SL error-correction encoder 207-2 inputs an SL transmission data signal (SL data signal), performs error correction encoding on the transmission signal, and outputs the encoded signal to SL modulator 208-2.

For example, SL modulator 208-2 modulates the signal inputted from SL error-correction encoder 207-2, and outputs the modulated signal to signal assigner 209.

For example, inter-UE resource adjustment information generator 212 generates, when receiving an indication from sensing processor 211 that there is resource allocation that is not preferred for transmission, inter-UE resource adjustment information for indicating, to another terminal 200, the resource that is not preferred for transmission, and outputs the inter-UE resource adjustment information to signal assigner 209.

For example, signal assigner 209 assigns the signals inputted from Uu modulator 208-1 and SL modulator 208-2 to a resource used for transmission. Further, for example, when resource reallocation is requested from inter-UE resource adjustment information receiver 206, signal assigner 209 changes the resource allocation.

When inter-UE resource adjustment information is inputted from inter-UE resource adjustment information generator 212, signal assigner 209 assigns, for example, inter-UE resource adjustment information to a resource used for transmission to another terminal 200. The signal assigned to the resource is outputted to transmitter 210, for example.

In signal assigner 209, ACK/NACK information may be assigned to an SL feedback channel (e.g., PSFCH), for example.

For example, transmitter 210 performs radio transmission processing such as amplification and up-conversion on the input signal from signal assigner 209, and transmits the radio signal from an antenna.

Note that, although a demodulator, an error-correction decoder, an error-correction encoder, and a modulator are individual blocks for each of a Uu link and an SL in the configuration illustrated in FIG. 6, some or all of the blocks may be shared.

Further, inter-UE resource adjustment information is not limited to the case where the inter-UE resource adjustment information is received by terminal 200 as higher layer signaling. For example, inter-UE resource adjustment information may be preconfigured in SIM or preconfigured in terminal 200 by an application layer called pre-configured.

(Fourth Configuration of Terminal 200)

Figure 7:
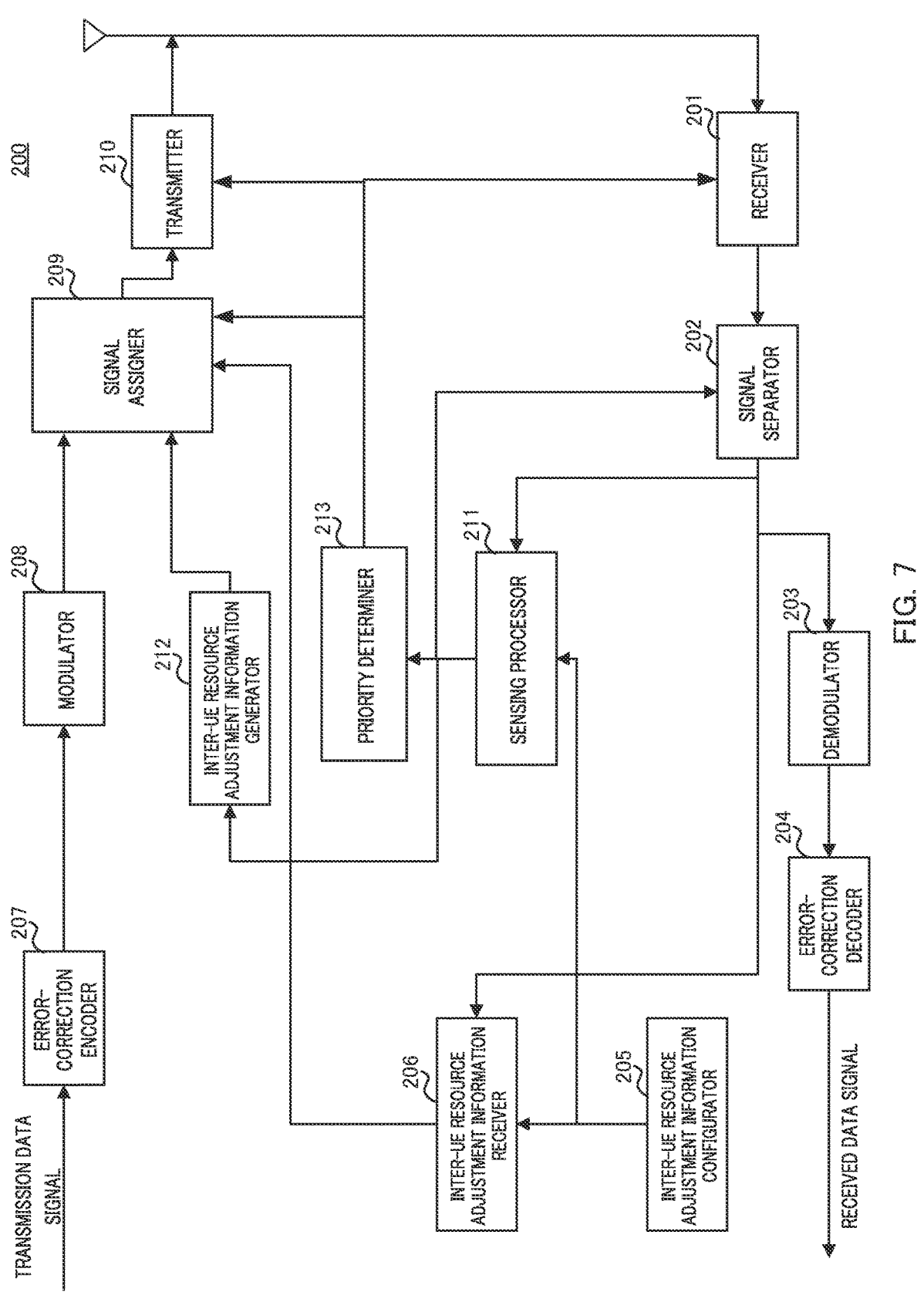
FIG. 7 is a block diagram illustrating the fourth configuration example of the terminal.

Terminal 200 of the fourth configuration illustrated in FIG. 7 differs from the configuration illustrated in FIG. 5 in that terminal 200 additionally includes priority determiner 213. Note that it may be understood that, in FIG. 7, blocks denoted by the same reference numerals as those used in FIG. 5 correspond to the blocks described in FIG. 5.

In the fourth configuration, for example, receiver 201 receives a reception signal via an antenna, performs radio reception processing such as low-noise amplification and down-conversion on the reception signal, and then outputs the signal to signal separator 202. Further, for example, receiver 201 switches a reception time or reception timing of a signal in accordance with input from priority determiner 213.

For example, when there is input from inter-UE resource adjustment information configurator 205, sensing processor 211 obtains resource allocation information such as which resource is reserved, based on 1st stage SCI. Further, sensing processor 211 obtains a transmission source ID (source ID) based on 2nd stage SCI, for example, and detects whether the resource is preferred for transmission. When it is detected that the resource is not preferred for transmission, sensing processor 211 outputs information on the detection to inter-UE resource adjustment information generator 212 and priority determiner 213, for example.

Further, for example, when sensing processor 211 detects, from the resource allocation information, that there is resource allocation addressed to terminal 200 illustrated in FIG. 7, sensing processor 211 indicates the resource information to signal separator 202. This indication allows signal separator 202 to separate a signal mapped to the resource indicated from sensing processor 211 from the reception signal.

For example, priority determiner 213 determines a priority when inter-UE resource adjustment information and a resource of another signal are transmitted and received in the same symbol or overlapping resources. The result of this determination (e.g., referred to as priority information) may be outputted to signal assigner 209, for example. Further, priority determiner 213 outputs, for example, a signal for switching between transmission and reception in accordance with the priority information to either or both of transmitter 210 and/or receiver 201.

For example, signal assigner 209 assigns the signal inputted from modulator 208 to a resource used for transmission. Further, for example, when resource reallocation is requested from inter-UE resource adjustment information receiver 206, signal assigner 209 changes the resource allocation.

When inter-UE resource adjustment information is inputted from inter-UE resource adjustment information generator 212, signal assigner 209 assigns, for example, the inter-UE resource adjustment information to a resource used for transmission to another terminal 200. Allocation of a signal or information to a resource herein may be performed in accordance with input from priority determiner 213, for example. The signal assigned to the resource is outputted to transmitter 210, for example.

Note that, for example, ACK/NACK information may be allocated to an SL feedback channel (e.g., PSFCH) in signal assigner 209.

For example, transmitter 210 performs radio transmission processing such as amplification and up-conversion on the input signal from signal assigner 209, and transmits the radio signal from an antenna. Further, for example, transmitter 210 switches a transmission time or transmission timing in accordance with input from priority determiner 213.

Note that priority determiner 213 and the operation related to priority determiner 213 may be applied to, for example, the first configuration illustrated in FIG. 4 and the third configuration illustrated in FIG. 6.

[Description of Inter-UE Coordination]

Figure 8:
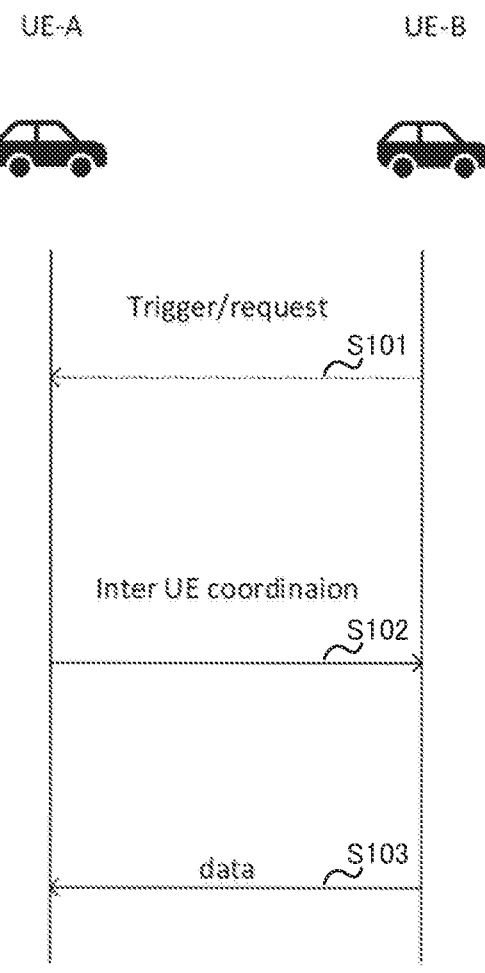
FIG. 8 is a sequence diagram illustrating an exemplary inter-UE coordination operation.

For example, as illustrated in FIG. 8, it is considered that the first terminal (UE-A) transmits inter-UE resource adjustment information to the second terminal (UE-B) (S102), and UE-B uses the inter-UE resource adjustment information received from UE-A when UE-B selects a resource used for data transmission (S103) to UE-A.

For example, when UE-B cannot sufficiently perform sensing, or when it is preferred to reduce power consumption, UE-B can use the inter-UE resource adjustment information received from UE-A in order to reduce sensing frequency.

For example, UE-B may trigger or request UE-A, in advance, to transmit inter-UE resource adjustment information to UE-B (S101). UE-B may determine a resource used for transmission based on the inter-UE resource adjustment information received from UE-A, or may autonomously determine a resource used for transmission without using the inter-UE resource adjustment information received from UE-A.

For example, the following three methods are considered as methods for transmitting inter-UE resource adjustment information.

Type A: UE-A transmits a resource preferred for transmission by UE-B to UE-B

Type B: UE-A transmits a resource not-preferred for transmission by UE-B to UE-B Type C: UE-A transmits information that a resource of UE-B collides with another resource to UE-B The distinction between TypeB and TypeC is not necessarily clear, since a resource not-preferred for transmission by UE-B in Type B may include a resource that collides with another resource. In the present disclosure, in a case where a collision of resources occurs in the future in Type B, Type C is classified as a case where a collision of resources has occurred, but the present disclosure is not limited to such a classification.

Hereinafter, an operation will be described, referring terminal 200 that transmits inter-UE resource adjustment information to UE-A and terminal 200 that receives the inter-UE resource adjustment information to UE-B. When inter-UE resource adjustment information is transmitted so as to be receivable by specific terminal 200, specific terminal 200 can receive the inter-UE resource adjustment information.

When inter-UE resource adjustment information is transmitted so as to be receivable by a plurality of terminals 200, the plurality of terminals 200 can receive the inter-UE resource adjustment information. Therefore, UE-B that receives the inter-UE resource adjustment information is not limited to one.

[Description of PSFCH Configuration]

Figure 9:
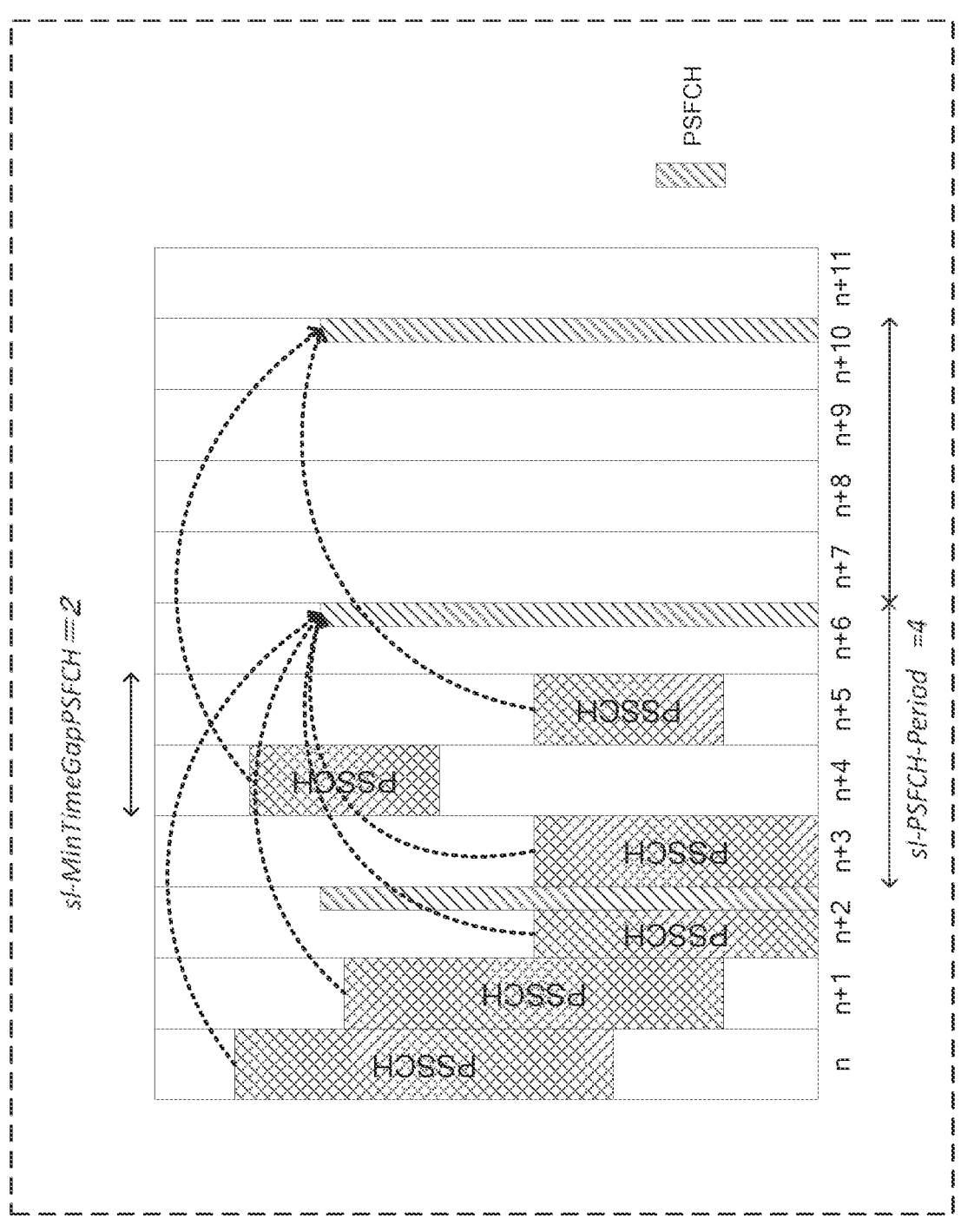
FIG. 9 illustrates an exemplary configuration of a physical sidelink feedback channel (PSFCH)

A HARQ ACK or NACK of SL communication can be indicated by a PSFCH. The number of slots per which a PSFCH is mapped (in other words, a period in which a PSFCH can be transmitted) is determined by a parameter called sl-PSFCH-Period, for example. For example, FIG. 9 illustrates an example in which sl-PSFCH-Period=4 and a PSFCH is mapped every 4 slots.

Further, a parameter called sl-MinTimeGapPSFCH determines a PSFCH of at least how may slots after PSSCH reception a HARQ-ACK or NACK is transmitted in. FIG. 9 illustrates an example in which sl-MinTimeGapPSFCH=2 and a HARQ-ACK or NACK is transmitted in a PSFCH two slots after PSSCH reception.

In the present embodiment, it is preferred that a resource in which the inter-UE resource adjustment information is transmitted be a resource that does not collide with another resource. For example, it is assumed that terminal 200 of Rel. 16 does not know the presence or absence of a resource configured for terminal 200 of Rel. 17 or a later release.

Thus, in a case where inter-UE resource adjustment information is configured for terminal 200 of Rel. 17 or a later release, a resource for transmitting inter-UE resource adjustment information is a resource that has less impact on terminal 200 of Rel. 16.

Figure 10:
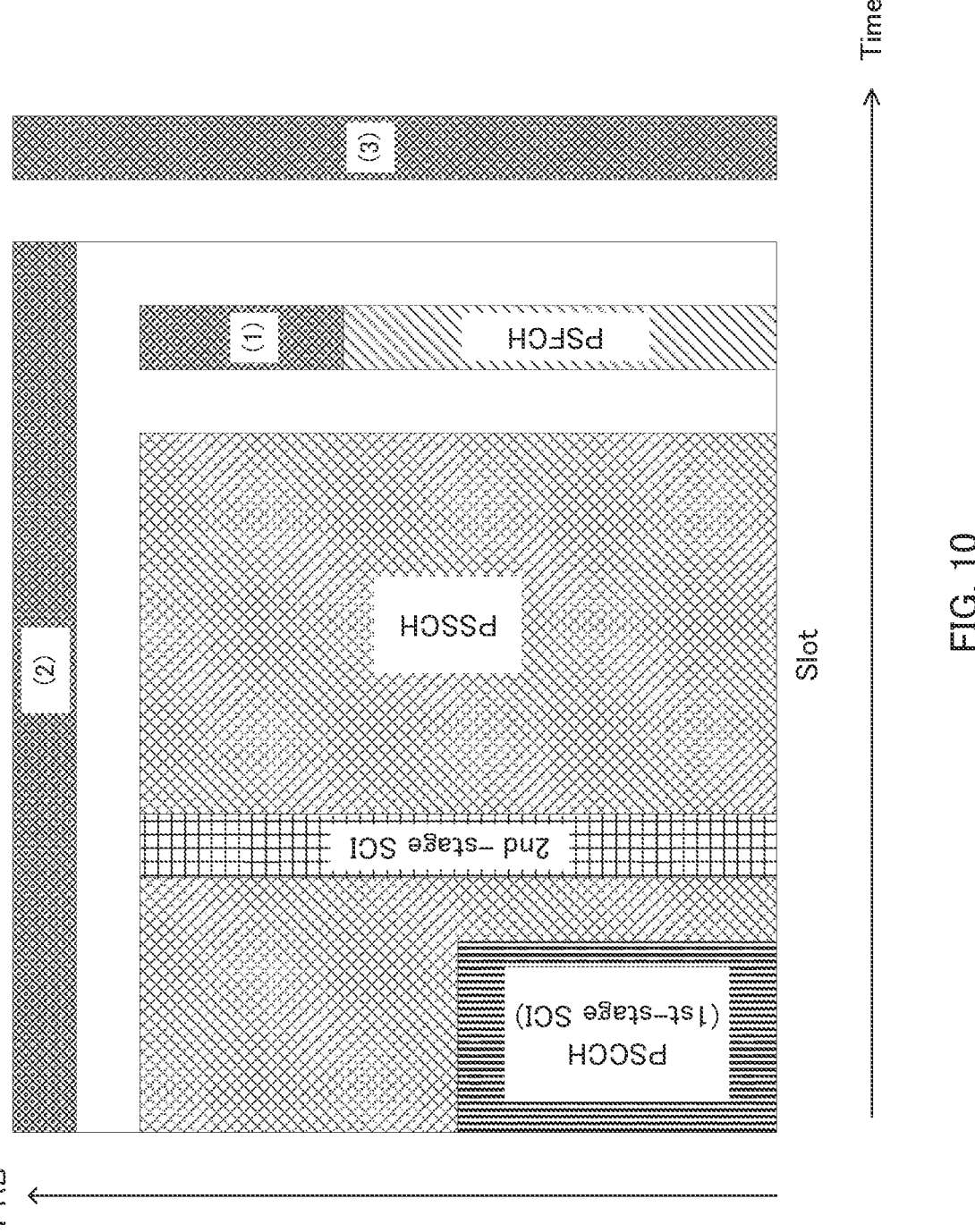
FIG. 10 illustrates exemplary mapping of a resource for transmitting inter-UE resource adjustment information.

In the present embodiment, the following resources (1), (2) and (3) are described as examples (see also FIG. 10).

(1) A resource for transmitting inter-UE resource adjustment information is the same symbol as the symbol of a PSFCH for transmitting a HARQ-ACK or NACK. In this case, a collision of the resource with a PSCCH and PSSCH can be avoided.

(2) A resource for transmitting inter-UE resource adjustment information is a certain frequency resource in a resource pool. For example, in Rel. 16, the number of physical resource blocks (PRBs) in a resource pool is possibly not a multiple of the number of PRBs included in a subchannel. In this case, the remaining PRB is not used for resource allocation. When a resource that is not included in a subchannel exists in the PRB of the resource pool, the resource is allocated for transmission of inter-UE resource adjustment information.

(3) A resource for transmitting inter-UE resource adjustment information is a resource outside a resource pool. The resource outside the resource pool is, for example, a resource outside a resource pool for Rel. 16. However, the resource outside the resource pool may be a resource within a resource pool for terminal 200 of Rel. 17 or a later release, or may be defined as a resource that is also outside the resource pool for terminal 200 of Rel. 17 or a later release but in which transmission and reception can be performed.

[Resource Determination Method]

Next, an exemplary method for determining a time resource for transmitting inter-UE resource adjustment information will be described.

For a candidate for a time resource, resources satisfying a certain condition (e.g., parameters K1 and K2, which will be described later), such as resources (1) to (3) exemplarily illustrated in FIG. 10, may be configured in advance as candidate resources.

Examples of the configuration methods includes: preconfigured by the specification; preconfigured in SIM; configured in an application layer called pre-configured; configured in a system information block (SIB) called configured or in another higher layer such as RRC; configured in MAC; and configured in a physical layer by SCI.

When the same symbol as a PSFCH is configured as a candidate resource, a new configuration of a candidate for a time resource may be, for example, the same as the resource candidate position of the PSFCH. In a case where a resource is a different resource from a PSFCH in a resource pool or a resource is outside the resource pool, a candidate for a time resource may be configured separately.

In a case where inter-UE resource adjustment information of Type B is assumed, for example, the candidate position may be further narrowed down from the determined candidate position by the following two parameters K1 and K2.

K1: The minimum processing time for UE-A transmitting inter-UE resource adjustment information after receiving a PSCCH transmitted by UE-B K2: The minimum processing time for UE-B stopping transmission after receiving inter-UE resource adjustment information Inter-UE resource adjustment information may be transmitted in a period after time K1 after reception of a PSCCH and before the timing time K2 earlier than scheduled PSSCH transmission timing reserved by the PSCCH. In other words, the transmittable period of inter-UE resource adjustment information may be configured based on K1 and K2.

In Type B, when the PSSCH resource reserved by a PSCCH by UE-B is not-preferred for transmission, UE-A may prompt UE-B to change the resource used for transmission by transmitting inter-UE resource adjustment information.

The candidate position for transmitting inter-UE resource adjustment information may be after K1 from the PSCCH transmitted by UE-B and K2 before the scheduled transmission time of the PSSCH assigned (in other words, reserved) by UE-B.

The time units of K1 and K2 may be configured in units of symbols, slots, or actual time (e.g., msec). Regarding the numbers of symbols and slots, the actual time may vary depending on, for example, subcarrier spacing.

Further, K1 may be configured to be longer than K2, for example. For example, when terminal 200 receives a PSCCH and identifies a transmission destination, it takes time to demodulate and decode 2nd stage SCI mapped in a PSSCH. Further, the processing of terminal 200 generating and transmitting inter-UE resource adjustment information also takes time.

Therefore, it can be said that K1 is likely to be longer than processing time K2 required for stopping transmission of the scheduled PSSCH after receiving inter-UE resource adjustment information. However, K2 may be configured to be longer than K1. When terminal 200 that takes a long time for processing of stopping transmission is assumed, a long value may be set for K2 corresponding to the processing time of stopping transmission, or the same value as K1 may be set for K2.

When the candidate position for a resource for transmitting inter-UE resource adjustment information is determined, UE-A transmits, to UE-B, inter-UE resource adjustment information using the resource in the candidate position, for example. When no resource that satisfies the conditions of K1 and K2 exists, UE-A need not transmit inter-UE resource adjustment information.

Further, when no resource that satisfies the conditions of K1 and K2 exists, UE-A may transmit a HARQ-NACK to UE-B in a PSFCH instead of inter-UE resource adjustment information, for example. This operation may be understood to correspond to an operation of switching from Type B to Type C when no resource to be transmitted for Type B exists.

In Type A, for example, the following K3 may be configured instead of K2. Further, in the case of Type A, UE-A may determine resource allocation and transmit the information as inter-UE resource adjustment information, and thus K1 need not be configured in this case.

K3: The minimum time for UE-B starting transmission after receiving inter-UE resource adjustment information The value of K3 may be the same as or different from the value of K2. For example, since UE-B generates data and starts transmission of the generated data after receiving inter-UE resource adjustment information, a value longer than K2 may be set for K3.

Configuration with K1 and K2 (or K1 and K3) can prevent UE-A from transmitting inter-UE resource adjustment information for which processing by UE-B (e.g., processing of stopping or starting transmission of a PSSCH reserved by a PSCCH) cannot be made in time even though UE-B receives the information.

The respective time indicated by K1, K2, and K3 may be understood as buffer time. Further, the respective time indicated by K1, K2, and K3 need not be "minimum processing time", and may be, for example, "maximum processing time", or may be "average processing time" of a plurality of terminals 200.

K1, K2, and K3 may be configured for terminal 200 individually or may be shared by a plurality of terminals 200. For example, respective values of K1, K2, and K3 may be determined in advance or may be dynamically configured based on capability information of terminal 200.

Further, one of K1 and K2 (or K1 and K3) may be derived from the other value, for example. Furthermore, both of K1 and K2 (or K1 and K3) need not be necessarily configured, and only one (e.g., K2 or K3) of them may be configured.

OPERATION EXAMPLE

Figure 11:
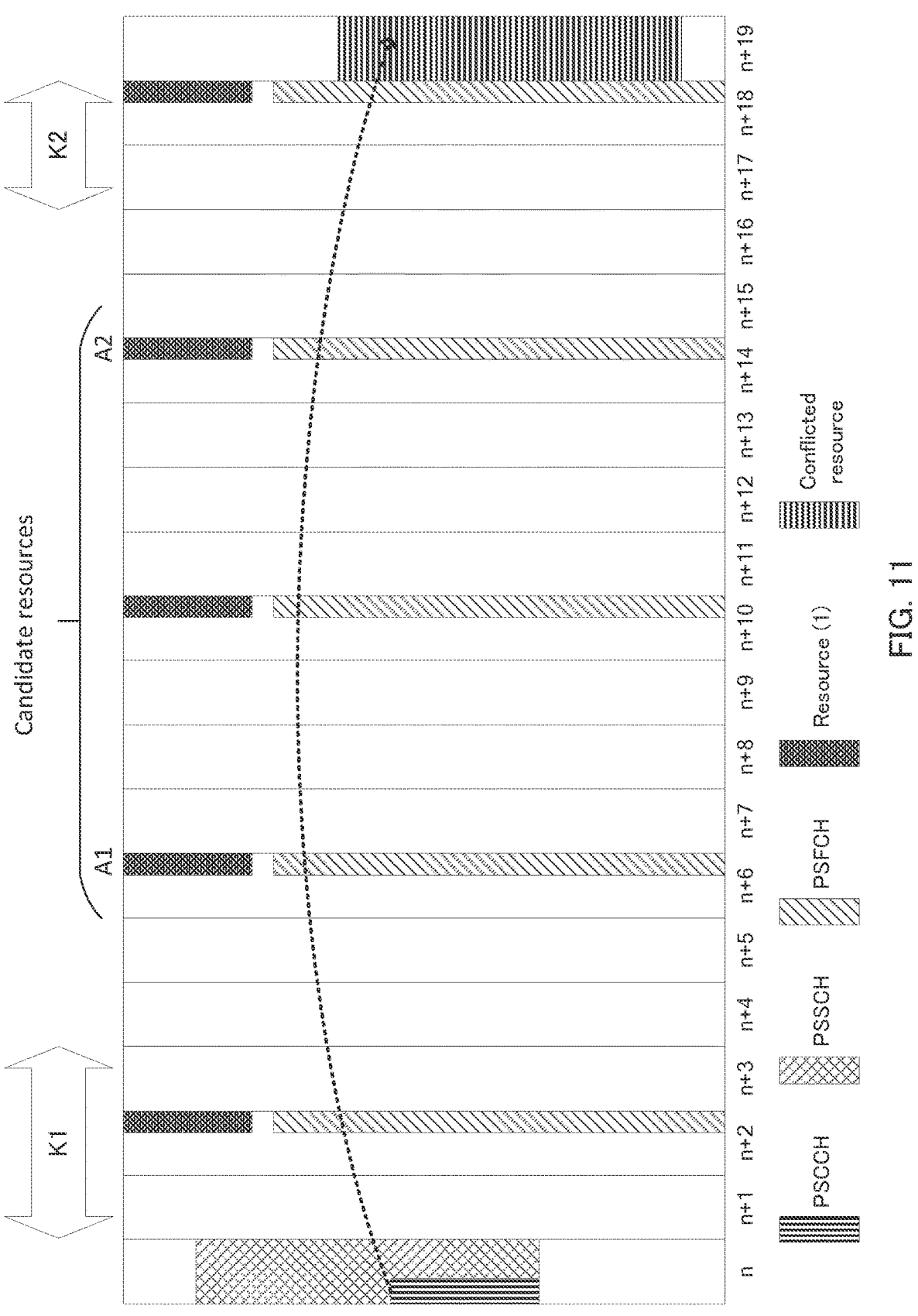
FIG. 11 illustrates an exemplary operation according to the present disclosure.

Hereinafter, an operation example will be described with reference to FIG. 11. FIG. 11 illustrates an example in which UE-B assigns PSSCHs of slot #n (n is an integer of 0 or more) and slot #n+19 by a PSCCH in slot #n. When UE-A detects that the resource reserved by another UE and the resource reserved by UE-B collide with each other by sensing PSCCHs, UE-A transmits inter-UE resource adjustment information to UE-B.

Note that, although a case of detecting a collision has been described as an example, inter-UE resource adjustment information may be transmitted due to another reason or a situation such as half duplex issue in which reception is not performed because destination terminal 200 is in a transmitting state, or a case where reception quality of a resource is expected to be low (e.g., equal to or less than a threshold value) in a resource.

According to the conditions of K1 and K2, UE-A assumes (determines) that, for example, in FIG. 11, three slots of slot #n+6, slot #n+10, and slot #n+14 are candidate resources (1) that can be used for transmission of inter-UE resource adjustment information.

Operation Example A1

In Operation Example A1, the earliest resource in time among a plurality of candidate resources is used for transmission of inter-UE resource adjustment information. In FIG. 11, inter-UE resource adjustment information is transmitted to UE-B in resource (1) of slot #n+6, which is the earliest slot among slots #n+6, #n+10, and #n+14.

In this case, UE-B that has received the inter-UE resource adjustment information can recognize that the resource reserved by UE-B is not suitable for transmission at an early stage, so that the delay time associated with reselection of a resource can be reduced. For example, when receiving (or detecting) inter-UE resource adjustment information in slot #n+6, UE-B can recognize that the resource reserved by UE-B collides with a resource reserved by another UE, and can change the resource allocation reserved by UE-B. Changing the resource allocation can resolve the resource collision. Therefore, performance of SL communication can be enhanced.

Operation Example A2

In Operation Example A2, the latest resource in time among a plurality of candidate resources is used for transmission of inter-UE resource adjustment information, for example. In FIG. 11, inter-UE resource adjustment information is transmitted in resource (1) of slot #n+14 among slots #n+6, #n+10, and #n+14.

In this case, for example, even when a collision between a resource reserved by UE-B and a resource reserved by another UE occurs in a slot later than slot #n+6, UE-B can recognize the occurrence of the collision by inter-UE resource adjustment information received in slot #n+14.

For example, when detecting inter-UE resource adjustment information in slot #n+14, UE-B can recognize that the resource reserved by UE-B collides with a resource reserved by another UE, and can change the resource allocation reserved by UE-B. Changing the resource allocation can resolve the resource collision. Therefore, performance of SL communication can be enhanced.

Operation Example A3

In Operation Example A3, for example, UE-A freely selects a resource used for transmission of inter-UE resource adjustment information from a plurality of candidate resources. In this case, it is possible to reduce the probability that a resource in which inter-UE resource adjustment information is transmitted collides with another resource.

For example, when UE-A is to receive or transmit another resource in a candidate slot in which UE-A is to transmit inter-UE resource adjustment information, transmission of inter-UE resource adjustment information by UE-A is possibly interrupted.

In such a case, among a plurality of candidate resources, for example, among three resources (1) of slots #n+6, #n+10, and #n+14 as illustrated in FIG. 11, UE-A can select resource (1) of a slot in which UE-A can perform transmission, and can transmit inter-UE resource adjustment information in resource (1) of the selected slot.

For example, UE-B detects (or monitors) whether inter-UE resource adjustment information is transmitted in a plurality of slots. When inter-UE resource adjustment information is detected in any of the slots, UE-B can recognize that the resource reserved by UE-B collides with another resource, and can change the resource allocation. Changing the resource allocation can resolve the resource collision. Therefore, performance of SL communication can be enhanced.

Operation Example A4

In Operation Example A4, a resource used for transmission of inter-UE resource adjustment information is determined among a plurality of candidate resources based on a predefined formula.

The formula is shared between UE-A and UE-B in advance. For example, the resource used for transmission of inter-UE resource adjustment information may be determined by Mod (the number of candidate resources, source ID) based on the number of candidate resources and source ID of UE-B. Using the formula (or a rule) to determine a resource used for transmission of inter-UE resource adjustment information can reduce the probability that the resource in which inter-UE resource adjustment information is transmitted collides with another resource.

For example, when the number of candidates is "3" as illustrated in FIG. 11 and Source ID of UE-B is "2", Mod(3,2)=1. Thus, UE-A transmits inter-UE resource adjustment information in resource (1) of slot #n+10 which is the first candidate of the 0th, 1st, and 2nd candidates.

When inter-UE resource adjustment information is detected in slot #n+10, UE-B can recognize that the resource reserved by UE-B collides with another resource, and can change the resource allocation reserved by UE-B. Changing the resource allocation can resolve the resource collision. Therefore, performance of SL communication can be enhanced.

As described above, using Source ID of UE-B for calculation for resource determination allows inter-UE resource adjustment information to be transmitted in the same resource even when there is a plurality of terminals 200 that transmit inter-UE resource adjustment information (in other words, terminal 200 corresponding to UE-A), which makes detection (or monitoring) by UE-B easier.

In addition, when UE-A transmits inter-UE resource adjustment information to another UE (e.g., UE-C (not illustrated)) different from UE-B, the probability that inter-UE resource adjustment information addressed to UE-B and UE-C is allocated to different resources increases. This can increase the probability that both UE-B and UE-C successfully receive inter-UE resource adjustment information from UE-A.

[Variation]

In a PSCCH, for example, it is possible to additionally indicate resource allocation of two slots in addition to the same slot as the PSCCH. When the slot in which the PSCCH is transmitted is slot #n, the additional two slots may be freely selected from 31 slots from slot #n+1 to slot #n+31, for example.

Figure 12:
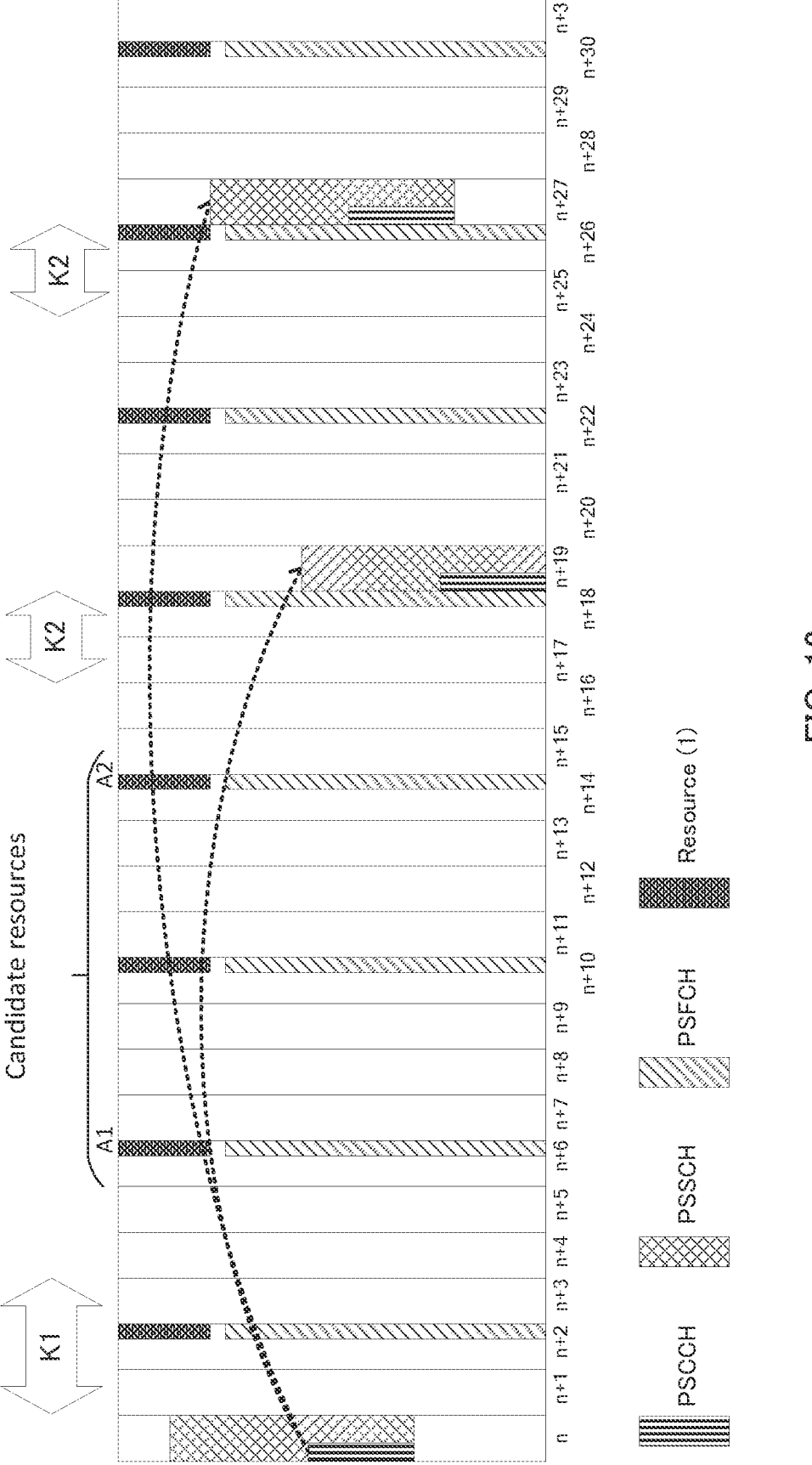
FIG. 12 illustrates an exemplary operation according to a variation.

For example, as illustrated in FIG. 12, a PSSCH resource of slot #n+19 and a PSSCH resource of slot #n+27 can be reserved by a PSCCH in slot #n. In this case, inter-UE resource adjustment information may be transmitted individually in each of resource (1) of slot #n+19 and resource (1) of slot #n+27, or information on two PSSCH resources may be transmitted by one piece of inter-UE resource adjustment information.

In a case where inter-UE resource adjustment information is transmitted for different PSSCH resources individually, the time slots of resources (1) in which inter-UE resource adjustment information is transmitted may be determined based on K1 and K2 with reference to the PSSCH resources individually allocated.

When inter-UE resource adjustment information for two PSSCH resources is collectively transmitted, a time slot of resource (1) in which inter-UE resource adjustment information is transmitted may be determined based on K1 and K2 with reference to a PSSCH resource in an earlier slot (slot #n+19 in FIG. 12) of the allocated PSSCH resources.

Further, a resource used for transmission of inter-UE resource adjustment information may be configured over a plurality of slots. The plurality of slots may be continuous slots or discontinuous slots.

Figure 13:
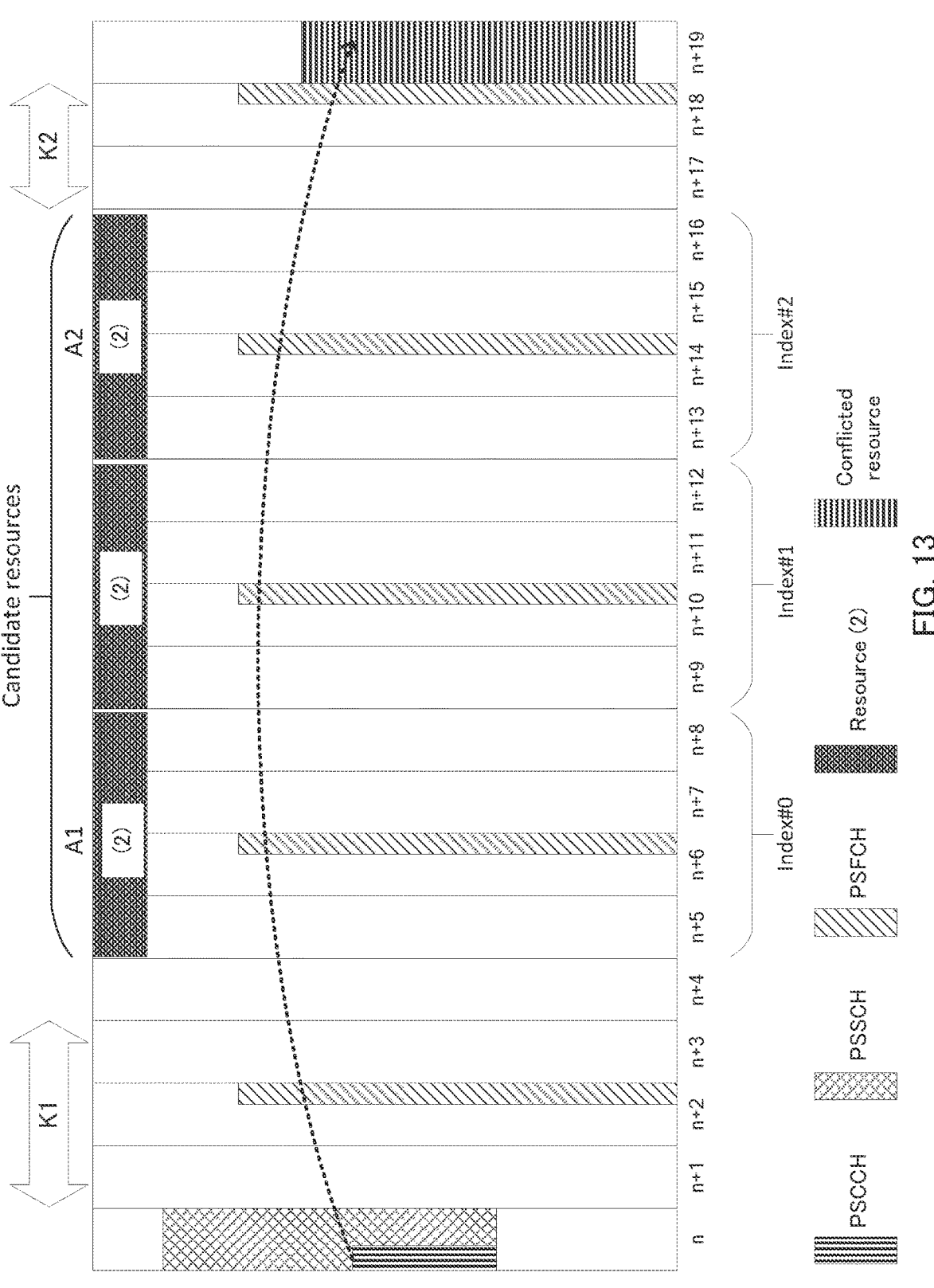
FIG. 13 illustrates an exemplary operation according to another variation.

Resource (2) in which a plurality of slots are collected is represented by indexes, for example. For example, as illustrated in FIG. 13, among indexes #0, #1, and #2 satisfying K1 and K2, an index used for transmission of inter-UE resource adjustment information may be selected (or determined) in accordance with any of above-described Operation Examples A1 to A4.

For example, among indexes #0, #1, and #2 satisfying conditions of K1 and K2, an earlier index may be selected in Operation Example A1, and a later index may be selected in Operation Example A2. Further, in Operation Example A3, UE-A may select any index of indexes #0, #1, and #2 satisfying K1 and K2, and in Operation Example A4, an index may be selected by a formula.

UE-A may transmit inter-UE resource adjustment information to UE-B in all or some slots of a plurality of slots belonging to the selected index.

Note that, when the number of candidate resources (or indexes) satisfying conditions of K1 and K2 (or K1 and K3) in above-described Operation Example A1 to A4 is one, UE-A may determine the candidate resource (or index) as a resource (or index) used for transmission of inter-UE resource adjustment information.

Further, Operation Examples A1 to A4 may be selectively (in other words, switched and) applied to terminal 200. For example, Operation Examples A1 to A4 to be applied may be switched depending on a difference in priority or reliability of communication.

[Priority of Inter-UE Resource Adjustment Information]

Inter-UE resource adjustment information may be transmitted from pre-configured UE, but a resource in which inter-UE resource adjustment information is transmitted possibly collides (or overlap) with a resource of another signal (a transmission signal or a reception signal). The collision of resources herein may indicate that the resources are mapped in the same symbol or PRB, and the resources need not completely overlap each other.

Another signal may include, for example, at least one of inter-UE resource adjustment information, a signal of another sidelink communications that differs from the communication (transmission or reception) related to inter-UE resource adjustment information, and a UL signal or a DL signal of Uu link communication between base station 100 and terminal 200.

Further, inter-UE resource adjustment information may be frequency-division-multiplexed, for example, in PRB units in a symbol of another transmission signal or another reception signal, but in this case, transmission of inter-UE resource adjustment information by UE is possibly interrupted for reasons such as because transmission and reception cannot be performed at the same time, transmission power may be insufficient, or resources collide between a plurality of pieces of inter-UE resource adjustment information.

Hereinafter, a priority (or arbitration) of inter-UE resource adjustment information and another signal will be described.

Operation Example B1

In Operation Example B1, when inter-UE resource adjustment information and at least one of a signal of another sidelink communication and a UL signal are mapped to the same symbol or to resources that partially overlaps each other, the signal of another sidelink and the UL signal are prioritized over the inter-UE resource adjustment information to be transmitted and received. The signals of another sidelink includes a signal of at least one of a PSCCH, a PSSCH, a PSFCH, and a PSBCH.

As illustrated as resource (1) in FIG. 10, when terminal 200 transmits or receives inter-UE resource adjustment information in the same symbol as a PSFCH, resource (1) of inter-UE resource adjustment information possibly overlaps with a symbol or resource of either or both of a PSFCH of sidelink communication and/or a UL signal of communication (Uu link communication) between base station 100 and terminal 200.

In such a case, terminal 200 may prioritize transmission or reception of the PSFCH and transmission or reception of the UL signal between base station 100 and terminal 200 over transmission or reception of inter-UE resource adjustment information. Thus, for example, it is possible to reduce the effect on transmission and reception of sidelink data (e.g., PSSCH) or signal allocation of communication between base station 100 and terminal 200 at the time of transmission and reception of inter-UE resource adjustment information.

The PSFCH and inter-UE resource adjustment information can be transmitted or received in the same symbol as the PSFCH by a multiplexing method such as frequency-division multiplexing. When transmission power is insufficient to perform transmission by such a multiplexing method in terminal 200, transmission of the PSFCH may be prioritized over inter-UE resource adjustment information.

Further, as illustrated as resource (2) in FIG. 10, when inter-UE resource adjustment information is transmitted in a certain frequency resource in a resource pool, resource (2) of inter-UE resource adjustment information possibly overlaps with a symbol or resource of either or both of a sidelink signal and/or a UL signal of a Uu link.

When terminal 200 transmits at least one of a PSCCH, a PSSCH, a PSFCH and a PSBCH in the sidelink, transmission of at least one of the PSCCH, the PSSCH, the PSFCH, and the PSBCH may be prioritized over transmission or reception of inter-UE resource adjustment information.

When resources are allocated to terminal 200 and terminal 200 receives at least one of a PSCCH and a PSSCH, reception of at least one of the PSCCH and the PSSCH may be prioritized over transmission or reception of inter-UE resource adjustment information.

When no resource is allocated to terminal 200, transmission of inter-UE resource adjustment information is prioritized over reception of a PSCCH and a PSSCH for sensing, and the reception may be performed simultaneously with the transmission of the inter-UE resource adjustment information.

When resources for receiving a PSBCH and for transmitting inter-UE resource adjustment information overlaps each other, terminal 200 may determine which of the reception of PSBCH and the transmission of the inter-UE resource adjustment information is prioritized. For example, because a PSBCH is a signal periodically transmitted, when the past received PSBCH is appropriate, transmission of inter-UE resource adjustment information is prioritized over reception of the PSBCH.

Further, as illustrated as resource (3) in FIG. 10, when inter-UE resource adjustment information is transmitted in a resource outside the resource pool, resource (3) of inter-UE resource adjustment information possibly overlaps with a symbol or resource of a UL signal or a DL signal of a Uu link. In such a case, terminal 200 may prioritize transmission of the UL signal or reception of the DL signal over transmission or reception of the inter-UE resource adjustment information.

When simultaneous transmission or simultaneous reception of inter-UE resource adjustment information and a UL signal or a DL signal is permitted, terminal 200 may perform simultaneous transmission or simultaneous reception of inter-UE resource adjustment information and a UL signal or a DL signal.

Operation Example B2

In Operation Example B2, an exemplary method will be described in which, when terminal 200 transmits inter-UE resource adjustment information to a plurality of resources or a plurality of terminals 200, resources are in the same symbol or overlaps each other, so that terminal 200 determines inter-UE resource adjustment information to be transmitted with priority.

Terminal 200 may determine the priority based on, for example, a factor of a resource that is not preferred for transmission. For example, exemplary factors by which UE-A determines that the resource transmitted by another UE is not preferred are as follows.

(A) A resource is addressed to UE-A, but is a resource that cannot be received because UE-A is in a transmission state or for another reason.

(B) A resource addressed to UE-A collides with another resource allocation (C) A resource is not addressed to UE-A, but is a resource that cannot be received by the addressed UE (D) A resource is not addressed to UE-A, but collides with another resource allocation The resource addressed to UE may include, a resource of unicast, groupcast, or broadcast, for example. UE-A may preferentially transmit inter-UE adjustment information related to the resource addressed to UE-A.

For example, inter-UE resource adjustment information may be transmitted by prioritizing cases (A) and (B) over cases (C) and (D). Case (A) may be prioritized between cases (A) and (B), for example.

This is because, for example, for case (B), the collision is possibly avoided when another UE cancels the transmission, and therefore, even when the collision occurs, there is possibility that the resource can be received depending on the line quality. Similarly, case (C) may be prioritized between cases (C) and (D), for example.

An exemplary operation performed when a plurality of resource collisions are detected will be described with reference to FIG. 14.

Figure 14:
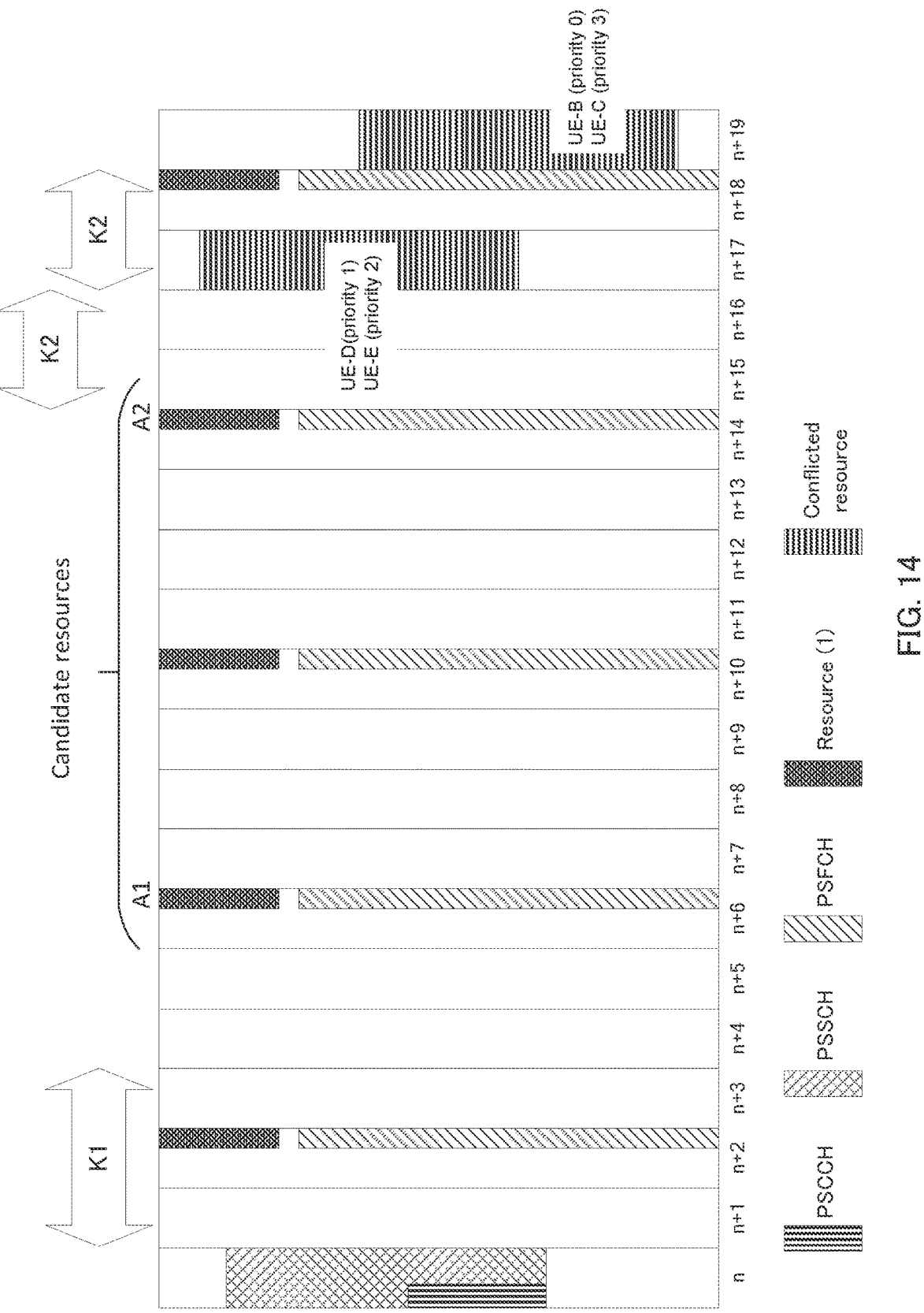
FIG. 14 illustrate an exemplary inter-UE coordination operation based on a priority.

FIG. 14 illustrates an example in which a resource reserved by UE-D (e.g., priority=1) and a resource reserved by UE-E (e.g., priority=2) collides with each other in slot #n+17. FIG. 14 further illustrates an example in which a resource reserved by UE-B (e.g., priority=0) and a resource reserved by UE-C (e.g., priority=3) collides with each other in slot #n+19.

Note that the priority may be, for example, a priority indicated by "priority" in 1st stage SCI in a PSCCH, and the lower the number, the higher the priority.

When resource collisions in slot #n+17 and slot #n+19 are detected by UE-A, the resources in which UE-A transmits inter-UE resource adjustment information may be determined in accordance with above-described Operation Example A1 or A2, but in this case, the transmissions are possibly performed in the same symbol. When transmission power is insufficient, inter-UE resource adjustment information to be transmitted is determined based on priorities 0 to 3, for example.

In Operation Example A3 or A4, inter-UE resource adjustment information can be transmitted in different resources in some cases, but the resource possibly overlaps with the resource of another inter-UE resource adjustment information.

Operation Example B2-1

UE-A may transmit inter-UE resource adjustment information for protecting the transmission of a high-priority resource. For example, in order to enable transmission or reception of a high-priority resource, UE-A may transmit inter-UE resource adjustment information for a resource that collides with the high-priority resource.

In FIG. 14, PSSCH resources reserved by UE-B and UE-C collides with each other, and the priority (=0) of the PSSCH resource reserved by UE-B is higher than the priority (=3) of the PSSCH resource reserved by UE-C.

In this case, in order to protect the PSSCH resource reserved by UE-B, UE-A transmits inter-UE resource adjustment information to UE-C and prompts UE-C to change resource allocation of the PSSCH reserved by UE-C, which collides with the PSSCH resource reserved by UE-B.

UE-C that has received this inter-UE resource adjustment information changes the resource allocation of the reserved PSSCH resource, so that the collision of the high-priority PSSCH resource can be avoided. Therefore, a high-priority PSSCH resource can be protected, and UE-B can perform transmission using the reserved PSSCH resource.

Alternatively, as a variation, UE-A may transmit inter-UE resource adjustment information to UE-B for the high-priority PSSCH resource (e.g., PSSCH resource reserved by UE-B). When UE-B receives this inter-UE resource adjustment information, the reserved PSSCH resource may be rescheduled.

This method is effective when UE is configured to receive inter-UE resource adjustment information for a high-priority PSSCH resource. For a low-priority resource, UE-C may perform transmission using the reserved PSCCH resource without receiving inter-UE resource adjustment information.

Operation Example B2-2

UE-A may preferentially transmit inter-UE resource adjustment information for a slot in which resource allocation of a PSSCH resource is earlier in time. In the example in FIG. 14, since slot #n+17 is earlier than slot #n+19, UE-A may transmit inter-UE resource adjustment information for the PSSCH resource of slot #n+17. In this case, the PSSCH resource of earlier slot #n+17 can be prioritized over the PSSCH resource of later slot #n+19 to be protected.

For example, since the priority (=1) of the PSSCH resource reserved by UE-D is higher than the priority (=2) of the PSSCH resource reserved by UE-E, UE-A may transmit inter-UE resource adjustment information to UE-E for the PSSCH resource of UE-E having a lower priority.

According to Operation Example A3, when there is a plurality of candidate resources in which inter-UE resource adjustment information can be transmitted, UE-A can freely select the candidate resource and transmit the inter-UE resource adjustment information. In this case, UE-A may transmit the information that a collision occurs between PSSCH resources of UE-D and UE-E in slot #n+17 to UE-E having a lower priority by inter-UE resource adjustment information in an earlier slot (e.g., slot #n+6).

Further, UE-A may transmit the information that a collision occurs between PSSCH resources of UE-B and UE-C in slot #n+19 to UE-C having a lower priority by inter-UE resource adjustment information in a later slot (e.g., slot #n+10 or slot n+14).

Note that UE-A may transmit inter-UE resource adjustment information for a PSSCH resource having a higher priority, similarly to the variation of Operation Example B2-1.

Operation Example B2-3

Which UE UE-A transmits inter-UE resource adjustment information for the PSSCH resource reserved by may be determined based on a determination criteria unique to UE-A, or may be individually determined for each UE.

Operation Example B2-4

UE-A may preferentially transmit inter-UE resource adjustment information for a PSSCH resource reserved by another UE belonging to the same group as UE-A. UEs in the same group are likely to support reception of inter-UE resource adjustment information, and therefore, effective use of inter-UE resource adjustment information is possible.

Operation Example B2-5

UE-A may determine a priority for transmitting inter-UE resource adjustment information based on a cast type. When the priorities are the same, UE-A may operate so as to protect a PSSCH resource in the order of broadcast, groupcast, and unicast.

For example, when UE detects a collision between a signal of broadcast and a signal of unicast. UE may transmit inter-UE resource adjustment information for a resource of unicast to prompt change of resource allocation. This allows UE of Rel. 16 to perform transmission without changing the resource when the UE receives a broadcast signal.

Operation Example C3

When transmission and reception of inter-UE resource adjustment information are performed in the same symbol or different resources, UE-A may prioritize reception of inter-UE resource adjustment information, for example. In this case, UE-A can prioritize reception of adjustment information on a resource of UE-A over another UE.

When inter-UE resource adjustment information is information on a resource allocated to UE-A, UE-A may prioritize transmission of the inter-UE resource adjustment information and prompt another UE to change the resource allocation.

[PSFCH]

In a PSFCH of Rel. 16, one bit of an ACK/NACK is transmitted in one symbol, which is the same format as PUCCH format 0. The format herein indicates the number of symbols, a sequence, mapping of a demodulation reference signal (DMRS), and/or the like.

The format of a PSFCH to which inter-UE resource adjustment information is mapped may be a different format from a PSFCH of Rel. 16. The different format may be, for example, a format equivalent to PUCCH formats 1, 2, 3, or 4. For example, bits more than two bits can be mapped in PUCCH formats 2, 3, and 4, so that those formats are suitable for a case where the information amount of inter-UE resource adjustment information is greater than two bits. Further, a PSFCH may be configured using a format different from a PUCCH format.

Other Embodiments

The above-described operation examples may be used in combination. For example, the operation examples may be different for each UE, or one UE may transmit inter-UE resource adjustment information using a plurality of operation examples.

Terminals that communicate in the sidelink may include a terminal that performs only one of transmission and reception and a terminal that performs both transmission and reception.

When it is assumed that a configuration regarding a sidelink is preconfigured, the configuration method may be preconfigured by the specification or preconfigured in SIM, for example. Further, the configuration method may include: configured in an application layer called Pre-configured, configured in a SIB called configured or in another higher layer such as RRC, and configured in MAC.

The above-described embodiments may be applied to Uu communication between base station 100 and terminal 200, replacing a PSCCH with a PDCCH, a PSSCH with a PDSCH or a PUSCH, a PSFCH with a PUCCH, and a PSBCH with a PBCH. The above-described embodiments may be applied to UCI transmitted in a PUSCH.

Further, the above-described embodiments may be applied only to Mode 2 of Mode 1 and Mode 2 for the sidelink.

Inter-UE resource adjustment information may be shared between a plurality of terminals 200, for example. The number of transmission terminals 200 that transmit inter-UE resource adjustment information is not limited to one, and may be two or more. The number of reception terminals 200 that receive inter-UE resource adjustment information is also not limited to one, and may be two or more. Further, for example, the roles of the transmission terminal and the reception terminal may be interchanged with each other.

For example, terminal 200 may be a terminal that supports either one or both of transmission and reception of inter-UE resource utilization adjustment information. Between terminals 200 that support both transmission and reception of inter-UE resource utilization adjustment information, sensing information that cannot be received due to Half duplex issue can be complimented with each other, for example.

Terminal 200 configured to receive inter-UE resource adjustment information may be configured not to perform sensing. This can reduce power consumption of sensing.

Information indicating whether terminal 200 supports functions, operations, or processing indicated in the above-described embodiments and variations may be transmitted (or indicated) from terminal 200 to another terminal 200 or base station 100 as, for example, capability information or a capability parameter of terminal 200.

The capability information may include an information element (IE) individually indicating whether terminal 200 supports at least one of the functions, operations, or processing described in the above-described embodiments and variations. Alternatively, the capability information may include an information element indicating whether terminal 200 supports a combination of any two or more of the functions, operations, or processing described in the above-described embodiments and variations.

Terminal 200 or base station 100 that has received the capability information may determine (or assume) the function, operation, or processing supported (or not supported) by terminal 200 of the transmission source of the capability information, for example. Terminal 200 or base station 100 that has received the capability information may perform an operation, processing, or control according to a determination result based on the capability information. For example, terminal 200 or base station 100 that has received the capability information may control resource allocation based on the capability information.

Note that terminal 200 not supporting some of the functions, operations, or processing described in each of the above-described embodiments and variations may be read as limiting such some of the functions, operations, or processing in terminal 200. For example, information or a request regarding such a limitation may be indicated to another terminal 200 or base station 100.

Information on the capability or limitation of terminal 200 may be, for example, defined in the standard or may be implicitly indicated to another terminal 200 or base station 100 in association with information known to another terminal 200 or base station 100 or information transmitted to another terminal 200 or base station 100.

Note that an ACK/NACK may be referred to as, for example, HARQ-ACK or HARQ-Feedback information. Repetition may also be referred to as, for example, slot aggregation, slot bundling, TTI aggregation, or TTI bundling.

Further, any component termed with a suffix, such as "-er," "-or," or "-ar" in the present disclosure may be replaced with another term such as "circuit (circuitry)," "device," "unit," or "module."

(Base Station)

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. In the sidelink communication, the base station may be replaced with a terminal. The base station may be a relay apparatus that relays communication between a higher node and a terminal. The base station may be a roadside unit as well.

(Uplink/Downlink/Sidelink)

The present disclosure may be applied to any of uplink, downlink and sidelink. The present disclosure may be applied to, for example, uplink channels, such as a PUSCH, a PUCCH, and a PRACH, downlink channels, such as a PDSCH, a PDCCH, and a PBCH, and side link channels, such as a Physical Sidelink Shared Channel (PSSCH), a Physical Sidelink Control Channel (PSCCH), and a Physical Sidelink Broadcast Channel (PSBCH).

Note that the PDCCH, the PDSCH, the PUSCH, and the PUCCH are examples of a downlink control channel, a downlink data channel, an uplink data channel, and an uplink control channel, respectively. The PSCCH and the PSSCH are examples of a sidelink control channel and a sidelink data channel, respectively. The PBCH and PSBCH are examples of broadcast channels, and the PRACH is an example of a random access channel.

(Data Channel/Control Channel)

The present disclosure may be applied to any of data channels and control channels. The channels in the present disclosure may be replaced with data channels including a PDSCH, a PUSCH and a PSSCH and/or control channels including a PDCCH, a PUCCH, a PBCH, a PSCCH, and a PSBCH.

(Reference Signal)

In the present disclosure, a reference signal is a signal known to both a base station and a mobile station and may also be referred to as a Reference Signal (RS) or a pilot signal. The reference signal may be any of a DMRS, a Channel State Information—Reference Signal (CSI-RS), a Tracking Reference Signal (TRS), a Phase Tracking Reference Signal (PTRS), a Cell-specific Reference Signal (CRS), and a Sounding Reference Signal (SRS).

(Time Interval)

In the present disclosure, time resource units are not limited to one or a combination of slots and symbols, and may be time resource units, such as frames, superframes, subframes, slots, time slots, subslots, minislots, or time resource units, such as symbols, orthogonal frequency division multiplexing (OFDM) symbols, single carrier—frequency division multiple access (SC-FDMA) symbols, or other time resource units. Further, the number of symbols included in one slot is not limited to any number of symbols exemplified in the embodiments described above and may be other numbers of symbols.

(Frequency Band)

The present disclosure may be applied to any of a licensed band and an unlicensed band.

(Communication)

The present disclosure may be applied to any of communication between a base station and a terminal (Uu-link communication), communication between a terminal and a terminal (Sidelink communication), and Vehicle to Everything (V2X) communication. The channels in the present disclosure may be replaced with a PSCCH, a PSSCH, a Physical Sidelink Feedback Channel (PSFCH), a PSBCH, a PDCCH, a PUCCH, a PDSCH, a PUSCH, and a PBCH.

Further, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

(Antenna Port)

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. Moreover, the antenna port may be specified as the minimum unit for multiplying a weight of a Precoding vector.

5G NR System Architecture and Protocol Stack>

3GPP has been working at the next release for the 5th generation cellular technology, simply called 5G, including the development of a new radio access technology (NR) operating in frequencies ranging up to 100 GHz. The first version of the 5G standard was completed at the end of 2017, which allowed proceeding to 5G NR standard-compliant trials and commercial deployments of terminals (e.g., smartphones).

Figure 15:
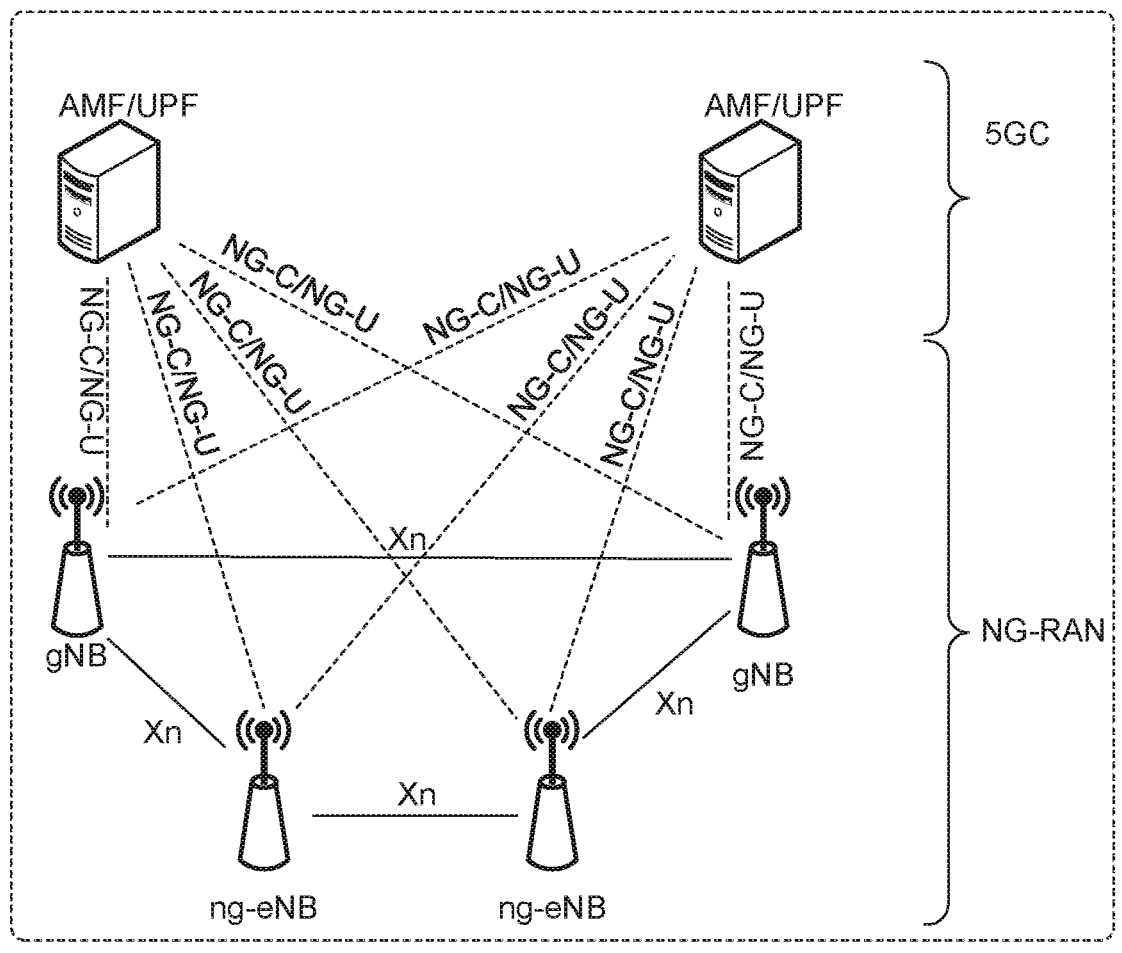
FIG. 15 an exemplary architecture of a 3GPP NR system.

For example, the overall system architecture assumes an NG-RAN (Next Generation-Radio Access Network) that includes gNBs. The gNB provides the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 15 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC, and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

<Functional Split Between NG-RAN and 5GC in 5G NR>

Figure 16:
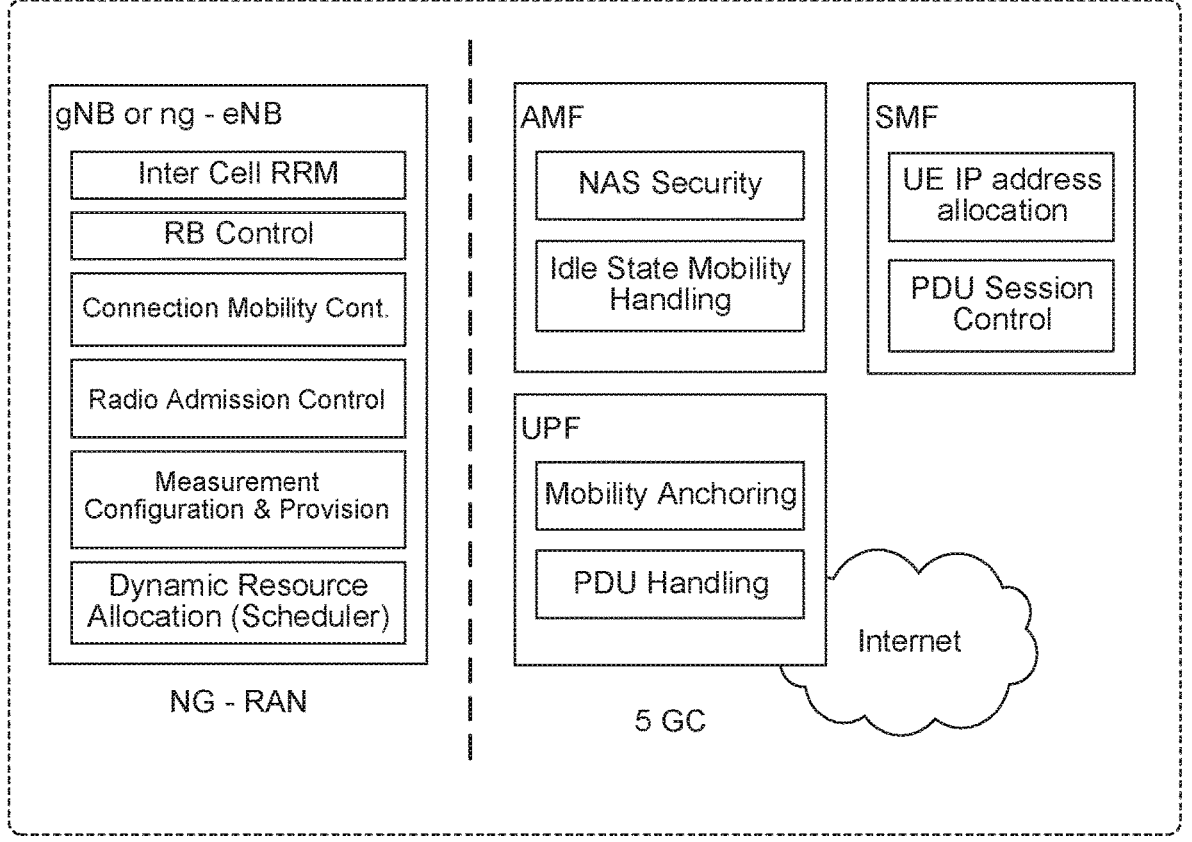
FIG. 16 schematically illustrates a functional split between NG-RAN and 5GC.

FIG. 16 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

Radio Resource Management functions such as Radio Bearer Control, Radio Admission Control, Connection Mobility Control, and dynamic allocation (scheduling) of both uplink and downlink resources to a UE;

IP header compression, encryption, and integrity protection of data;

Selection of an AMF during UE attachment in such a case when no routing to an AMF can be determined from the information provided by the UE;

Routing user plane data towards the UPF;

Routing control plane information towards the AMF;

Connection setup and release;

Scheduling and transmission of paging messages;

Scheduling and transmission of system broadcast information (originated from the AMF or an action management maintenance function (OAM: Operation, Admission, Maintenance));

Measurement and measurement reporting configuration for mobility and scheduling;

Transport level packet marking in the uplink;

Session management;

Support of network slicing;

QoS flow management and mapping to data radio bearers;

Support of UEs in the RRC_INACTIVE state;

Distribution function for NAS messages;

Radio access network sharing;

Dual connectivity; and

Tight interworking between NR and E-UTRA.

The Access and Mobility Management Function (AMF) hosts the following main functions:

Function of Non-Access Stratum (NAS) signaling termination;

NAS signaling security;

Access Stratum (AS) security control;

Inter-Core Network (CN) node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing; and

Session Management Function (SMF) selection.

In addition, the User Plane Function (UPF) hosts the following main functions:

Anchor Point for intra-/inter-RAT mobility (when applicable);

External Protocol Data Unit (PDU) session point for interconnection to a data network;

Packet routing and forwarding;

Packet inspection and a user plane part of Policy rule enforcement;

Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping); and

Function of downlink packet buffering and downlink data notification triggering.

Finally, the Session Management Function (SMF) hosts the following main functions:

Session management;

UE IP address allocation and management;

Selection and control of UPF;

Configuration function for traffic steering at the User Plane Function (UPF) to route traffic to a proper destination;

Control part of policy enforcement and QoS; and

Downlink data notification.

<RRC Connection Setup and Reconfiguration Procedure>

Figure 17:
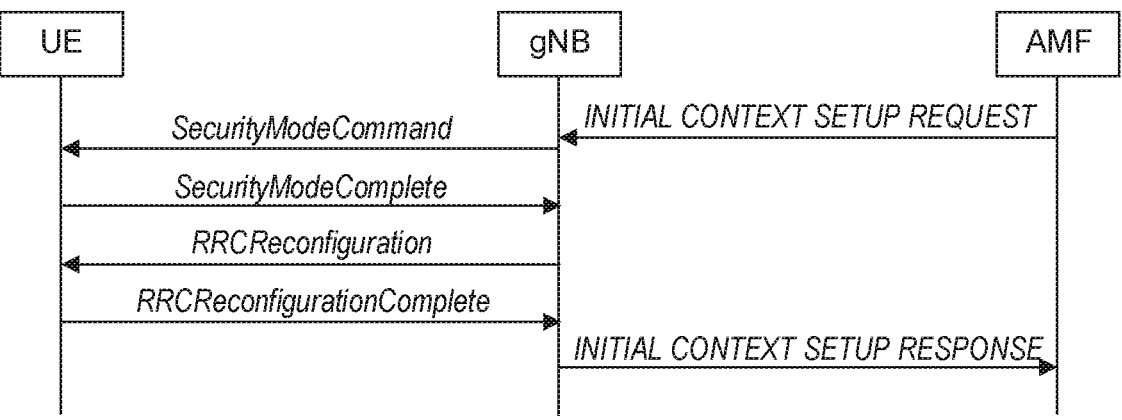
FIG. 17 is a sequence diagram of a Radio Resource Control (RRC) connection setup/reconfiguration procedure.

FIG. 17 illustrates some interactions between a UE, gNB, and AMF (a 5GC Entity) performed in the context of a transition of the UE from RRC_IDLE to RRC_CON-NECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB using the SecurityModeComplete message. Afterwards, the gNB performs the reconfiguration to setup the Signaling Radio Bearer 2, SRB2, and Data Radio Bearer (s), DRB (s) by means of transmitting to the UE the RRCRecon-figuration message and, in response, receiving by the gNB the RRCReconfigurationComplete from the UE. For a sig-naling-only connection, the steps relating to the RRCRecon-figuration are skipped since SRB2 and DRBs are not set up. Finally, the gNB informs the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a trans-mitter, which, in operation, transmits an initial context setup message to the gNodeB via the NG connection such that a signaling radio bearer between the gNodeB and a User Equipment (UE) is configured up. Specifically, the gNodeB transmits Radio Resource Control (RRC) signaling includ-ing a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 18:
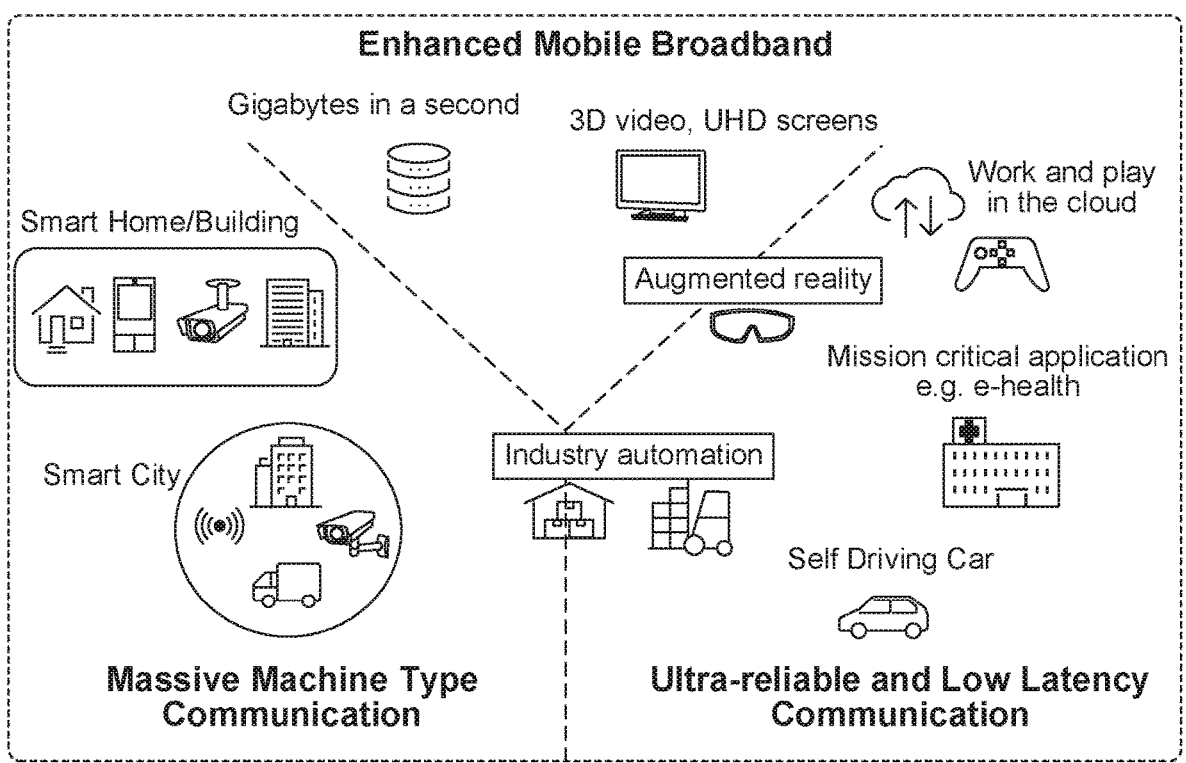
FIG. 18 schematically illustrates usage scenarios of enhanced Mobile BroadBand (eMBB), massive Machine Type Communications (mMTC), and Ultra Reliable and Low Latency Communications (URLLC)

FIG. 18 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 18 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements configured by TR 38.913. For NR URLLC in Release 15, key requirements include a target user plane latency of 0.5 ms for UL (uplink) and 0.5 ms for DL (downlink). The general URLLC requirement for one trans-mission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and devel-oped (for NR URLLC key requirements). Particular use cases of NR URLLC in Rel. 15 include Augmented Reality/ Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (config-ured grant) uplink, slot-level repetition for data channels, and downlink pre-emption. Pre-emption means that a trans-mission for which resources have already been allocated is stopped, and the already allocated resources are used for another transmission that has been requested later, but has lower latency/higher priority requirements. Accordingly, the already granted transmission is pre-empted by a later trans-mission. Pre-emption is applicable independent of the par-ticular service type. For example, a transmission for a service-type A (URLLC) may be pre-empted by a transmis-sion for a service type B (such as eMBB). Technology enhancements with respect to reliability improvement include dedicated CQI/MCS tables for the target BLER of 1E-5.

The use case of mMTC (massive machine type commu-nication) is characterized by a very large number of con-nected devices typically transmitting a relatively low vol-ume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter require-ments have been identified such as factory automation, transport industry and electrical power distribution. The tighter requirements are higher reliability (up to 10-6 level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearer (DRB) together with the PDU Session, e.g., as illustrated above with reference to FIG. 17. Further, additional DRB (s) for QoS flow (s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 19:
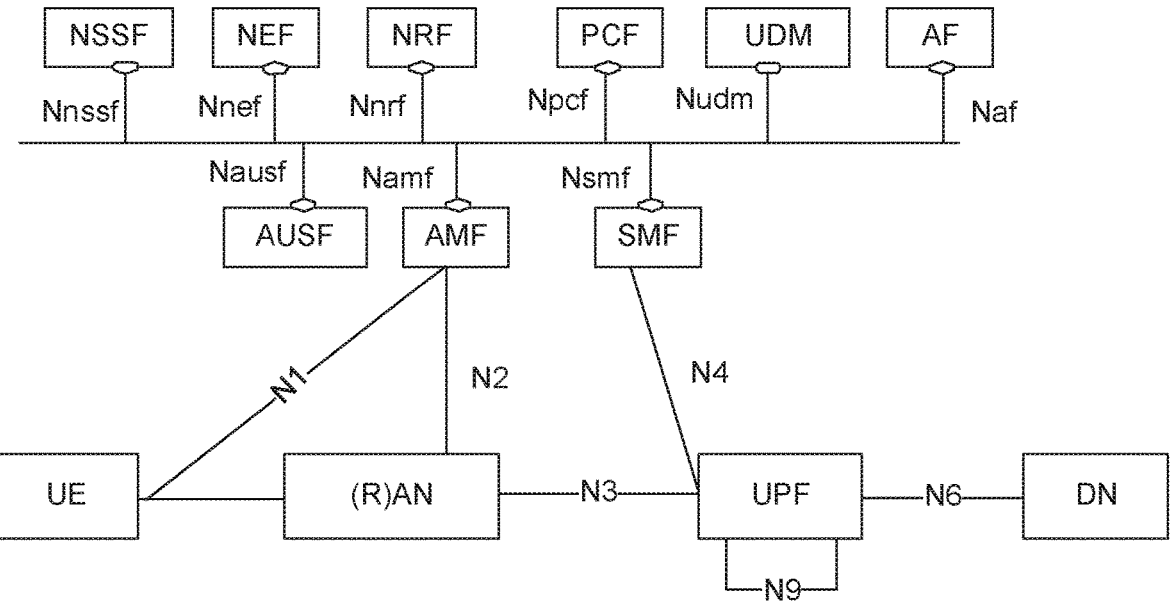
FIG. 19 is a block diagram illustrating an exemplary 5G system architecture for a non-roaming scenario.

FIG. 19 illustrates a 5G NR non-roaming reference architecture (see TS 23.501 v16.1.0, section 4.23). An Application Function (AF), e.g., an external application server hosting 5G services, exemplarily described in FIG. 18, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions FIG. 19 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that includes: a transmitter, which, in operation, transmits a request containing a QoS requirement for at least one of URLLC, eMMB and mMTC services to at least one of functions (for example NEF, AMF, SMF, PCF, UPF, etc.) of the 5GC to establish a PDU session including a radio bearer between a gNodeB and a UE in accordance with the QoS requirement, and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. When future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A communication apparatus according to an embodiment of the present disclosure may include control circuitry, which, in operation, determines to prioritize which of a plurality of communications including at least one of transmission and/or reception of information for adjusting resource use between communication apparatuses in sidelink communication.

In the communication apparatus according to the embodiment of the present disclosure, the plurality of communications includes another sidelink communication different from transmission and reception of the information and a communication between a base station and a terminal, and the control circuitry prioritizes, when a first communication and a second communication collide with each other, the second communication over the first communication, the first communication being at least one of the transmission and/or reception of the information, and the second communication being at least one of the another sidelink communication and/or the communication between the base station and the terminal.

In the communication apparatus according to the embodiment of the present disclosure, the control circuitry may prioritize, when transmission of the information and reception of the information collide with each other, the reception of the information.

In the communication apparatus according to the embodiment of the present disclosure, the control circuitry may prioritize, when transmission of the information and reception of the information collide with each other and the information is information on reception of the communication apparatus, the reception of the information.

In the communication apparatus according to the embodiment of the present disclosure, the control circuitry may determine, when a resource of a first signal and a resource of a second signal whose priority is higher than the first signal collide with each other, to preferentially transmit the information on the resource of the second signal over the information on the resource of the first signal.

In the communication apparatus according to the embodiment of the present disclosure, the control circuitry may determine, when collisions of signals occur, respectively, in a first resource and a second resource that is later in time than the first resource, to preferentially transmit the information on the first resource that is earlier in time.

In a communication method according to an embodiment of the present disclosure, a communication apparatus may determine to prioritize which of a plurality of communications including at least one of transmission and/or reception of information for adjusting resource use between communication apparatuses in sidelink communication, and may perform communication in accordance with the determination.

The disclosures of Japanese Patent Applications No. 2021-055903, filed on Mar. 29, 2021, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101 Inter-UE resource adjustment information configurator
103 Error-correction encoder
104 Modulator
106 Transmitter
107 Receiver
108 Demodulator
109 Signal assigner
110 Error-correction decoder
200 Terminal
201 Receiver
202 Signal separator
203 Demodulator
203-1 Uu demodulator
203-2 SL demodulator
204 Error-correction decoder
204-1 Uu error-correction decoder
204-2 SL error-correction decoder
205 Inter-UE resource adjustment information configurator
206 Inter-UE resource adjustment information receiver
207 Error-correction encoder
207-1 Uu error-correction encoder
207-2 SL error-correction encoder
208 Modulator
208-1 Uu modulator
208-2 SL modulator
209 Signal assigner
210 Transmitter
211 Sensing processor
212 Inter-UE resource adjustment information generator
213 Priority determiner

The invention claimed is:

1. A first user equipment (UE) comprising:
a receiver, which, in operation, receives a first Sidelink Control Information (SCI) format including a first priority value and a first reserved resource for Physical Sidelink Shared Channel (PSSCH) transmission from a second UE and a second SCI format including a second priority value and a second reserved resource for PSSCH transmission from a third UE;
circuitry, which, in operation, detects the second priority value of the third UE is smaller than the first priority value of the second UE, and determines that the first reserved resource and the second reserved resource overlap in time and frequency; and
a transmitter, which, in operation, transmits conflict information to the second UE of the first priority,
wherein the second priority value of the third UE smaller than the first priority value of the second UE indicates that the second reserved resource for PSSCH transmission from the third UE has higher priority than the first reserved resource for PSSCH transmission from the second UE.

2. The first UE according to the claim 1, wherein the first UE first transmits or receives Physical Sidelink Feedback Channels (PSFCHs) with Hybrid Automatic Repeat Request (HARQ) feedback information and subsequently transmits or receives PSFCHs containing the conflict information.

3. A communication method for a first user equipment (UE), the communication method comprising:
receiving a first Sidelink Control Information (SCI) format including a first priority value and a first reserved resource for Physical Sidelink Shared Channel (PSSCH) transmission from a second UE and a second SCI format including a second priority value and a second reserved resource for PSSCH transmission from a third UE;

detecting the second priority value of the third UE is smaller than the first priority value of the second UE;

determining that the first reserved resource and the second reserved resource overlap in time and frequency; and transmitting conflict information to the second UE of the first priority, wherein the second priority value of the third UE smaller than the first priority value of the second UE indicates that the second reserved resource for PSSCH transmission from the third UE has higher priority than the first reserved resource for PSSCH transmission from the second UE.

4. The communication method according to the claim 3, comprising:

first transmitting or receiving Physical Sidelink Feedback Channels (PSFCHs) with Hybrid Automatic Repeat Request (HARQ) feedback information and subsequently transmitting or receiving PSFCHs containing the conflict information.

\* \* \* \* \*